(12) United States Patent
Yoshioka

(10) Patent No.: US 9,045,282 B2
(45) Date of Patent: Jun. 2, 2015

(54) ARTICLE STORAGE FACILITY

(75) Inventor: Hideo Yoshioka, Higashiomi (JP)

(73) Assignee: Daifuku Co., Ltd., Osaka (JP)

( * ) Notice: Subject to any disclaimer, the term of this patent is extended or adjusted under 35 U.S.C. 154(b) by 735 days.

(21) Appl. No.: 13/143,468

(22) PCT Filed: Jan. 8, 2009

(86) PCT No.: PCT/JP2009/050138
§ 371 (c)(1),
(2), (4) Date: Sep. 13, 2011

(87) PCT Pub. No.: WO2010/079600
PCT Pub. Date: Jul. 15, 2010

(65) Prior Publication Data
US 2011/0315479 A1    Dec. 29, 2011

(51) Int. Cl.
*B65G 1/02* (2006.01)
*B65G 1/04* (2006.01)

(52) U.S. Cl.
CPC .. *B65G 1/02* (2013.01); *B65G 1/04* (2013.01); *B65G 2201/0297* (2013.01)

(58) Field of Classification Search
CPC .......................................................... B65G 1/02
USPC ........ 414/273, 281, 279, 788.1–788.3, 790.9, 414/792.8, 267, 287; 182/142, 145, 262
See application file for complete search history.

(56) References Cited

U.S. PATENT DOCUMENTS

| | | | | |
|---|---|---|---|---|
| 449,026 A * | 3/1891 | Andersen | ....................... | 187/243 |
| 588,982 A * | 8/1897 | Gray | ................ | 182/129 |
| 2,307,681 A * | 1/1943 | Kalmbach | ..................... | 254/286 |
| 3,051,335 A * | 8/1962 | Bartlett | ...................... | 414/545 |
| 3,672,471 A * | 6/1972 | Badding | ....................... | 187/259 |
| 3,743,116 A * | 7/1973 | Giessler et al. | ............... | 414/279 |
| 3,779,403 A * | 12/1973 | Young | ........................... | 414/279 |
| 3,832,802 A * | 9/1974 | Huys et al. | ....................... | 47/1.1 |
| 3,951,232 A * | 4/1976 | Okada | ............................ | 182/84 |
| 3,951,277 A * | 4/1976 | Hegelman | ..................... | 414/280 |
| 4,073,382 A * | 2/1978 | Fahey et al. | ....................... | 211/1 |
| 4,386,680 A * | 6/1983 | Reed | ............................. | 182/142 |
| 4,406,351 A * | 9/1983 | Littlejohn et al. | .............. | 182/47 |
| 4,469,198 A * | 9/1984 | Crump | .......................... | 182/141 |
| 4,496,027 A * | 1/1985 | Fisher | .......................... | 182/142 |
| 4,787,803 A * | 11/1988 | van Elten et al. | ............. | 414/281 |
| 4,836,336 A * | 6/1989 | Schroder | ....................... | 187/384 |
| 4,869,634 A * | 9/1989 | Carter | .......................... | 414/240 |

(Continued)

FOREIGN PATENT DOCUMENTS

| JP | 63001689 A | 1/1988 |
|---|---|---|
| JP | 8245185 A | 9/1996 |

(Continued)

*Primary Examiner* — Katherine Mitchell
*Assistant Examiner* — Candace L Bradford
(74) *Attorney, Agent, or Firm* — The Webb Law Firm

(57) ABSTRACT

A vertically movable work platform is suspended and supported by a plurality of suspension wires fed out from one or more of winding rotating bodies which is rotated such that the vertically movable work platform is vertically moved by the rotation of the one or more of winding rotating bodies. A support for receiving and supporting the lowering vertically movable work platform at a work height, and a stopper for preventing the rotation of the winding rotating body in a direction which tends to lower the vertically movable work platform when the vertically movable work platform reaches the work height are provided.

17 Claims, 14 Drawing Sheets

(56) References Cited

U.S. PATENT DOCUMENTS

| | | | | |
|---|---|---|---|---|
| 4,901,471 | A * | 2/1990 | van den Top | 47/1.1 |
| 5,141,381 | A * | 8/1992 | Kato et al. | 414/273 |
| 6,325,586 | B1 * | 12/2001 | Loy | 414/281 |
| 6,817,824 | B2 * | 11/2004 | Winkler | 414/273 |
| 6,997,288 | B2 * | 2/2006 | Kakko et al. | 187/391 |
| 7,214,023 | B2 * | 5/2007 | Sato et al. | 414/281 |
| 7,575,407 | B2 * | 8/2009 | Tsujimoto | 414/279 |
| 2004/0165974 | A1 * | 8/2004 | Gironi et al. | 414/281 |
| 2005/0224297 | A1 * | 10/2005 | Felder et al. | 187/395 |
| 2007/0095611 | A1 * | 5/2007 | Oertwig | 182/142 |
| 2009/0211844 | A1 * | 8/2009 | May | 182/142 |
| 2010/0018802 | A1 * | 1/2010 | Sani | 182/142 |
| 2011/0315488 | A1 * | 12/2011 | Yoshioka | 187/262 |
| 2013/0202392 | A1 * | 8/2013 | Morimoto et al. | 414/267 |
| 2013/0223959 | A1 * | 8/2013 | Koholka | 414/267 |

FOREIGN PATENT DOCUMENTS

| | | |
|---|---|---|
| JP | 9156886 A | 6/1997 |
| JP | 2001151307 A | 6/2001 |
| JP | 2002249204 A | 9/2002 |
| JP | 2002370807 A | 12/2002 |
| JP | 2008144544 A | 6/2008 |

* cited by examiner

Fig. 16
(A) 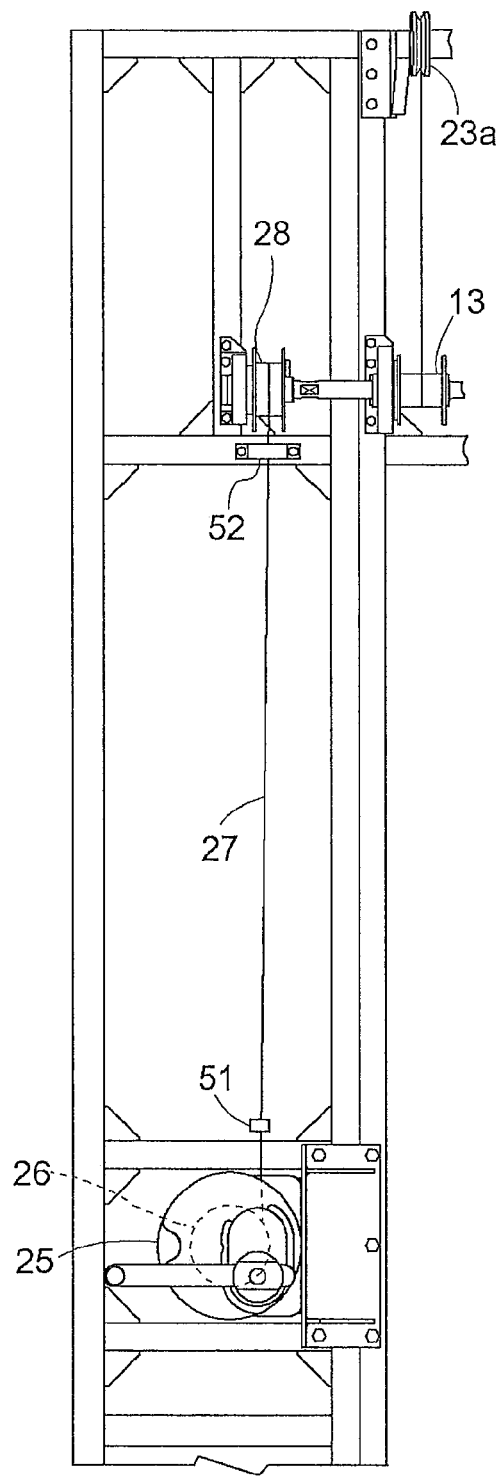 (B) 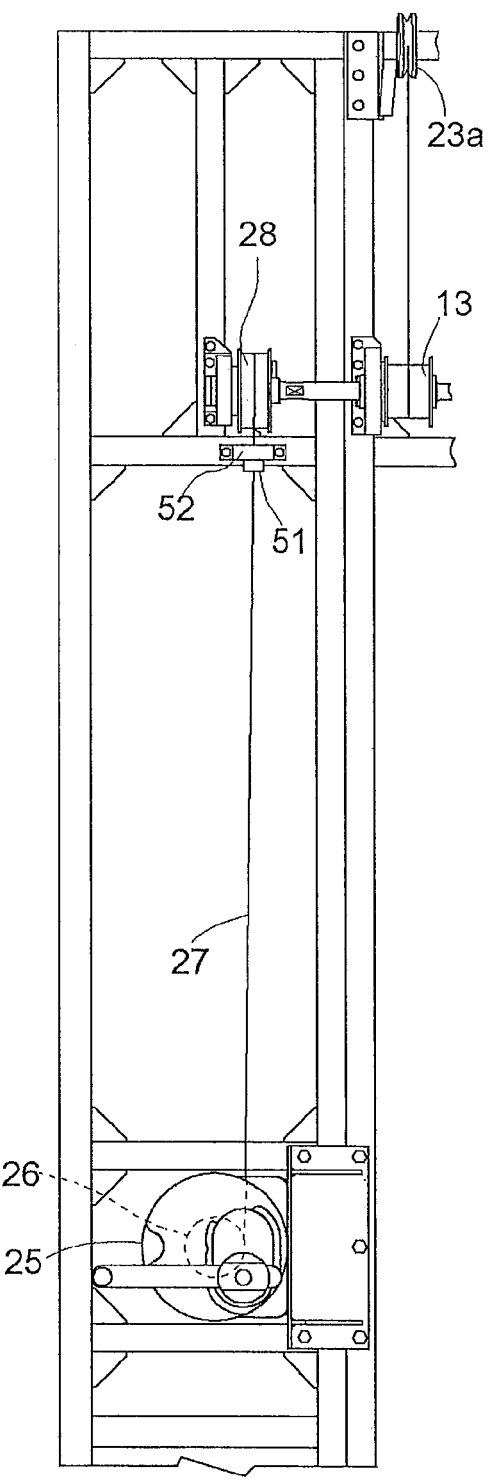

ARTICLE STORAGE FACILITY

BACKGROUND OF THE INVENTION

1. Field of the Invention

The present invention relates to an article storage facility which includes an article storage rack having a plurality of storage units for storing articles with the storage units being arranged in a rack vertical direction and in a rack lateral width direction, and a vertically movable work platform configured to move vertically between a retreat height, and a work height in the rack vertical direction in a travel space located forwardly of the article storage rack.

2. Description of the Related Art

In this type of article storage facility, a worker lowers the vertically movable work platform to the height at which the worker performs work and gets on the platform. And the maintenance work is done to the article storage shelf from this vertically movable work platform. Thus, the facility is configured such as to facilitate the maintenance work at an elevated position in the article storage shelf. The facility is configured such that the space can be utilized to transfer articles by raising the vertically movable work platform to above the height at which work is performed and stowing it away when not performing a maintenance work. (See, for example, Patent Document 1).

And, in the article storage facility described above, the vertically movable work platform is typically suspended and supported by a plurality of suspension wires which are fed out from a rotated winding rotating body. And the facility is configured such that the vertically movable work platform is raised or lowered by a forward or reverse rotation of the winding rotating body.

Patent Document 1: Japanese Patent Application Publication No. 2002-249204

In the article storage facility described above, since the vertically movable work platform is merely suspended and supported at two or more locations by the suspension wires fed out from the winding rotating body when the vertically movable work platform is lowered to the work height to perform a maintenance work, the work is difficult to perform when the operator performs the maintenance work on the vertically movable work platform because the platform sways easily and is unstable.

To this end, it may be contemplated to provide a support which receives and supports the vertically movable work platform, which is being lowered to the work height, to facilitate the maintenance work by improving the stability of the vertically movable work platform and making it difficult for the vertically movable work platform to sway when the operator performs a maintenance work on the vertically movable work platform by receiving and supporting the vertically movable work platform with the support.

However, if the vertically movable work platform is configured be received and supported by a support at the work height, as described above, and if the winding rotating body is further rotated in the direction that tends to lower the vertically movable work platform with the platform received and supported at the work height by the support, an excessive amount of the suspension wires for suspending and supporting the vertically movable work platform will be fed out from the winding rotating body and the wires will slacken. Because this causes the plurality of suspension wires wound by the winding rotating body to be wound improperly (irregular winding), which causes different suspension wires that are being fed out from the winding to be fed out by different amounts, the vertically movable work platform may tilt when it is raised from the work height.

SUMMARY OF THE INVENTION

The present invention was made in light of the state of the art described above, and its object is to provide an article storage facility in which the vertically movable work platform which is raised and lowered manually can be prevented from being tilted and with an improved manual vertical movement operation, and in which the vertically movable work platform can be accurately moved to the work height. In order to attain these objects, the article storage facility in accordance with the present invention comprises an article storage rack having a plurality of storage units for storing articles, the storage units being arranged in a rack vertical direction and in a rack lateral width direction, and a vertically movable work platform configured to move vertically between a retreat height and a work height in the rack vertical direction in a travel space located forwardly of the article storage rack. The article storage facility also comprises one or more winding rotating bodies manually operated directly or indirectly, wherein the vertically movable work platform is configured to be suspended and supported by a plurality of suspension wires fed out from the one or more winding rotating bodies and to be moved vertically by a rotation of the one or more winding rotating bodies; a support for receiving and supporting, at the work height, the vertically movable work platform that is being lowered; and stopper means for preventing a rotation of the one or more of winding rotating bodies in a direction that tends to lower the vertically movable work platform when the vertically movable work platform reaches the work height.

That is, because the vertically movable work platform can be lowered to the work height by rotating the winding rotating body so as to lower the vertically movable work platform, the maintenance work at an elevated location in the article storage rack is facilitated by performing the maintenance work for the article storage rack from this vertically movable work platform. Since the winding rotating body or bodies is/are manually operated directly or indirectly, there is no need to provide an electric motor or other device. Therefore, there is no need to perform maintenance or repair work required for the electric motor at the time of failure. Thus, the vertically movable work platform can be vertically moved reliably with a simple device.

And since the vertically movable work platform may be raised and retreated from the work height by rotating the winding rotating body or bodies so as to raise the vertically movable work platform, articles can be transported utilizing the travel space located forwardly of the article storage rack. Thus the travel space can be utilized effectively.

And when the vertically movable work platform is lowered to the work height by rotating the winding rotating body so as to lower the vertically movable work platform, the vertically movable work platform is received and supported at the work height by the support and a further rotation of the winding rotating body is prevented by the stopper means in the direction which tends to lower the vertically movable work platform. Therefore, when the vertically movable work platform is located at the work height and is received and supported by the support, the winding rotating body or bodies cannot be rotated in the direction which tends to lower the vertically movable work platform. As a result, an excessive amount of the plurality of suspension wires for suspending and supporting the vertically movable work platform will never be fed out from the winding rotating body or bodies to cause slacking of the wires. Since a plurality of suspension wires spooled by the winding rotating body will not be wound irregularly, tilting of the vertically movable work platform can be prevented. Therefore, when manually moving the vertically movable work platform vertically, there is no need to perform the operations carefully not to cause more than a required amount of the suspension wires to be fed out from the winding rotating body to prevent slacking, and not to cause irregular winding of the suspension wires. Instead, the vertical movement operation can simply be carried out until the rotation of the raising rotating body is stopped by the stopper means. Therefore, an article storage facility can be provided in which the ease with which the vertical movement operations are performed is improved and in which the vertically movable work platform can be accurately placed at the work height.

In an embodiment of the invention, the facility further comprises a rotating operation rotating body for spooling an operating wire fed out from a rotating body of a manually operated vertical movement operating member and for feeding out the operating wire spooled by the rotating body of the vertical movement operating member wherein the one or more of winding rotating bodies rotate in unison with the rotating operation rotating body.

That is, by rotating the rotating body of the vertical movement operating member by manually operating the vertical movement operating member, the rotating operation rotating body rotates to spool the operating wire fed out from the rotating body of the vertical movement operating member, or to feed out the operating wire spooled by the rotating body of the vertical movement operating member. Thus, with the rotation of the rotating operation rotating body in the forward direction or in the reverse direction, the co-rotating winding rotating body or bodies also rotate in the forward or reverse direction which results in a vertical movement of the vertically movable work platform.

And only the operating wire is required between the manually operated vertical movement operating member and the rotating operation rotating body. And since it is not necessary to provide a plurality of suspension wires such as ones provided between the vertically movable work platform and the winding rotating body, the number of wires can be reduced compared with a case where a plurality of suspension wires are brought around to the location of the manually operated vertical movement operating member. Therefore, an article storage facility can be provided in which the space occupied by a device for performing the vertical movement operation of the vertically movable work platform can be reduced.

In an embodiment of the invention, the stopper means preferably includes a movable body that meshes with a pivot shaft which rotates in unison with the one or more of winding rotating bodies and that moves in the direction of the axis of the pivot shaft as the one or more of the winding rotating bodies rotate, and a receiving body that restricts movement of the movable body such that an end of a moving range of the movable body in the direction of the pivot shaft is a position that corresponds to the work height for the vertically movable work platform.

That is, as the pivot shaft rotates when the winding rotating body or bodies is/are rotated, the movable body meshed with this pivot shaft moves along the direction of the axis of the pivot shaft. As the winding rotating body or bodies rotate in the direction which tends to lower the vertically movable work platform, the vertically movable work platform moves downwardly and the movable body moves toward one side in the axial direction of the pivot shaft. And the movement of the movable body to one side in the axial direction of the pivot shaft is restricted when the vertically movable work platform reaches the work height because the movable body abuts the receiving body. And a further rotation of the winding rotating body in the direction that tends to lower the vertically movable work platform is prevented.

Therefore, the movable body abuts the receiving body, and the rotation of the pivot shaft which rotates in unison with the winding rotating body or bodies is restricted when the vertically movable work platform is lowered to the work height. And because the rotation of the pivot shaft which rotates in unison with the winding rotating body or bodies is/are directly restricted, an article storage facility can be provided in which the rotation of the winding rotating body or bodies in the direction which tends to lower the vertically movable work platform can be prevented reliably when the vertically movable work platform reaches the work height.

In an embodiment of the invention, the stopper means may include an abutting member provided to the operating wire, and an wire accommodating body which the operating wire extends through and which receives and stops the abutting member at a position where the vertically movable work platform reaches the work height.

That is, when the manually operated vertical movement operating member is operated to have the rotating body of the vertical movement operating member feed out or spool the operating wire, the abutting member provided to this operating wire moves along the longitudinal direction of the operating wire. When the manually operated vertical movement operating member is operated in the direction that tends to lower the vertically movable work platform, the abutting member moves along the longitudinal direction of the operating wire toward the wire accommodating body. And when the vertically movable work platform is lowered to the work height, the abutting member is received and stopped by the wire accommodating body and a further rotation of the rotating operation rotating body is prevented.

That is, because of the configuration in which the movement of the abutting member provided to the wire is restricted by the wire accommodating body, it is easy to have an stopping arrangement by providing the abutting member to the operating wire so that the abutting member can be accurately stopped and restricted by the wire accommodating body when the vertically movable work platform reaches the work height. Therefore, an article storage facility can be provided in which the rotation of the winding rotating body in the direction which tends to lower the vertically movable work platform can be accurately prevented when the vertically movable work platform reaches the work height.

In an embodiment of the invention, the article storage facility preferably further comprises a transport device configured to move vertically to transport articles between a storage unit and an article take-in-and-out portion, wherein the retreat height is preferably higher than an upper end of a vertical movement range of the transport device, and the work height is preferably located at an intermediate position of the vertical movement range.

With this configuration, the transport device can be moved vertically over an entire range of the vertical movement range by positioning the vertically movable work platform at the retreat height, and the vertically movable work platform can be vertically moved between the work height and the retreat height by positioning the transport device below the intermediate position in the vertical movement range.

In an embodiment of the invention, it is preferable that the retreat height for the vertically movable work platform is adjacent an upper end in the rack vertical direction of the travel space located forwardly of the article storage rack, and the work height is at a vertically intermediate location in the rack vertical direction in the travel space, and that the article storage rack includes an entrance for entering and exiting the travel space to get on and off the vertically movable work platform located at the work height and a maintenance door for opening and closing this entrance, and that door opening prevention means is provided for allowing the maintenance door to be opened when the vertically movable work platform is located at a height close to the work height, and for preventing opening of the maintenance door when the vertically movable work platform is located above the work height.

An article storage rack in the article storage facility of the conventional technology typically includes an entrance for entering and exiting the travel space to get on and off the vertically movable work platform located at the work height, and a maintenance door for opening and closing this entrance. When performing a maintenance work, the vertically movable work platform is lowered to the work height and the maintenance door is opened to open the entrance. And after moving into the travel space from the entrance, maintenance work is performed on the vertically movable work platform. After the maintenance work is completed, and after getting off the vertically movable work platform, and after moving out of the travel space through the entrance, the maintenance door is closed to close the entrance. The vertically movable work platform is then lifted to the retreat height.

However, because the maintenance door can be opened freely in this conventional article storage facility, even when the vertically movable work platform is located above the work height or a height close to it such as when the vertically movable work platform is retreated to the retreat height etc., an operator can enter the travel space through the entrance by opening the maintenance door to open the entrance despite the fact that the vertically movable work platform is not located at the work height. Thus, the operator may contact the vertically movable work platform which is moving vertically: it was not possible to open the maintenance door without anxiety.

On the other hand, in the embodiment of the invention described above, because the prevention of the opening by the door opening prevention means is canceled when the vertically movable work platform is located at a height close to the work height, the maintenance door is allowed to be opened and can be opened. And since opening of the maintenance door is prevented by the door opening prevention means when the vertically movable work platform is above a height close to the work height, the maintenance door can not be opened. Therefore, an article storage facility can be provided in which the maintenance door can be opened only when the vertically movable work platform is located at a height close to the work height so that the maintenance door can be opened without anxiety.

In an embodiment of the invention, the door opening prevention means preferably includes a preventing body which can be switched between a permitting attitude in which the maintenance door is allowed to be opened and a preventing attitude in which an opening operation is prevented wherein the preventing body is urged toward the preventing attitude. And the preventing body is preferably configured to be displaced toward the permitting attitude by an operating force associated with a lowering movement of the vertically movable work platform when the vertically movable work platform is located at a height close to the work height, and to be released from the operating force from the vertically movable work platform to be returned toward the preventing attitude when the vertically movable work platform is located above the work height.

That is, by lowering the vertically movable work platform and positioning it at a height close to the work height, the door opening prevention means is displaced toward the permitting attitude in which the maintenance door is allowed to be opened and is moved to the permitting attitude under the weight of the vertically movable work platform. And by raising the vertically movable work platform and positioning it above a height close to the work height, the door opening prevention means is released from the operating force from the vertically movable work platform and is returned toward and to the preventing attitude under an urging force. Only the door opening prevention means is required, which can be switched between the permitting attitude in which the maintenance door is allowed to be opened and the preventing attitude in which the opening operation of the maintenance door is prevented, and which is urged toward the preventing attitude such that the door opening prevention means is pressed toward the permitting attitude by the vertically movable work platform which is lowered to a height close to the work height. Therefore, an article storage facility having door opening prevention means with a simple configuration can be provided.

In an embodiment of the invention, it is preferable that a manually operating element for switching the preventing body between the permitting attitude and the preventing attitude is removably provided to the insert portion which can be accessed from outside the travel space.

That is, even when the preventing body can not be switched to the permitting attitude despite the fact that the vertically movable work platform has been lowered to a height close to the work height due, for instance, to a failure of the door opening prevention means, the manually operating element can be inserted to the insert portion, which can be accessed from outside the travel space, to switch the preventing body to the permitting attitude by the manually operating element so that the maintenance door can be opened to open the entrance and maintenance work can be performed. In addition, by removing the manually operating element from the insert portion, the preventing body can not be manually switched to the permitting attitude when the vertically movable work platform is located above a height close to the work height. This prevents the operator from falling after having been unable to get on the vertically movable work platform. Thus, an article storage facility can be provided in which the usability of the maintenance door is improved.

In an embodiment of the invention, the article storage facility preferably further comprises a manually operable vertical movement operating member provided to an exterior side of an outer wall, in which the entrance is formed, for rotating the one or more of winding rotating bodies; a checking window provided to at least one of the maintenance door and the outer wall; and a display portion located a position at which the display portion can be visually checked from the checking window to indicate that the vertically movable work platform is raised to the retreat height.

In a conventional article storage facility in which a manually operable vertical movement operating member is provided to an exterior side of an outer wall, in which the entrance is formed, for rotating the one or more of winding rotating bodies, and in which the vertically movable work platform can be vertically moved manually when the operator enters and exits the travel space, since the operator who operates the manually operable vertical movement operating member cannot check the vertical position of the vertically movable work platform because of the outer wall, the platform is raised sometimes to an insufficient height, and is sometimes raised too high when raising the vertically movable work platform to the retreat height after maintenance work is finished. Thus, it was difficult to raise the vertically movable work platform accurately to the retreat height.

Also, where the door opening prevention means is provided as with the case of the embodiment of the present invention, the maintenance door cannot be opened to check the vertical position of the vertically movable work platform because the maintenance door cannot be opened when the vertically movable work platform is located above a height close to the work height.

However, in the configuration of the afore-described embodiment of the present invention, the facility further comprises a manually operable vertical movement operating member provided to an exterior side of an outer wall, in which the entrance is formed, for rotating the one or more of winding rotating bodies; a checking window provided to at least one of the maintenance door and the outer wall for checking the vertical position of the vertically movable work platform; and a display portion located at a position at which the display portion can be visually checked from the checking window to indicate that the vertically movable work platform is raised to the retreat height. Therefore, the vertically movable work platform can be manually moved vertically with ease from outside the travel space by means of the manually operable vertical movement operating member provided to an exterior side of an outer wall when entering and exiting the travel space. The operator can also raise the vertically movable work platform by operating the vertical movement operating member while checking the display portion visually through the checking window from outside the travel space to check to see whether the vertically movable work platform has been raised to the retreat height. Therefore, an article storage facility can be provided in which the vertically movable work platform can be raised accurately to the retreat height from outside the travel space.

In an embodiment of the invention, the checking window is preferably provided to the maintenance door provided at a position corresponding to one end side of the travel space in the rack lateral width direction, and the display portion is preferably provided at a position corresponding to the other end side of the travel space in the rack lateral width direction.

That is, with this configuration, because, for example, the display portion can be checked easily through the checking window even when the display portion is provided at a higher position than the checking window for example, an article storage facility can be provided in which it is easy to check the display portion visually through the checking window from outside the travel space.

In an embodiment of the present invention, the display portion preferably includes a display body having a colored portion for visual check and a cover body for covering the colored portion for visual check, and is preferably configured such that the colored portion is exposed from the cover body as the display body of the display portion is lifted by engaging the vertically movable work platform which is being raised and such that the colored portion is covered by the cover body as the display body of the display portion is lowered by engaging the vertically movable work platform which is being lowered.

That is, the height of the vertically movable work platform—such as when the vertically movable work platform has been raised to the retreat height—can be checked by visually by checking the exposed colored portion from the checking window.

And the display portion is configured to move vertically as a result of the display body engaging the vertically movable work platform when the vertically movable work platform is moved vertically, and to be capable of being switched between a state in which the colored portion of the display body is exposed from the cover body and a state in which the colored portion of the display body is covered by the cover body. Therefore, there is no need to provide an additional device for raising or lowering the display body as the vertically movable work platform is moved vertically. Thus, an article storage facility can be provided in which the configuration of the display portion can be simplified.

In an embodiment of the invention, the colored portion for visual check preferably has sections colored in different colors arranged in the rack vertical direction of the display body.

That is, because the colored portion is colored such that it has sections to have a plurality of colors, it is easy to see how far the vertically movable work platforms has been raised by seeing the colored portion being exposed as the vertically movable work platform is raised. It is also easy to see how far the vertically movable work platforms has been lowered by seeing the colored portion being covered as the vertically movable work platform is lowered. Therefore, an article storage facility can be provided in which the vertically movable work platform can be moved vertically while making it possible to see, with ease, how far the vertically movable work platform has been vertically moved.

In an embodiment of the invention, an engaged portion for engaging the vertically movable work platform is preferably provided in a laterally central portion of the display body.

That is, since the vertically movable work platform engages the engaged portion provided in the laterally central portion of the display body to vertically move the display body, even if the vertically movable work platform is tilted, it will be difficult for the engaged display body to become tilted because the vertically movable work platform engages the engaged portion provided in the laterally central portion of the display body. Thus, an article storage facility can be provided in which the display body smoothly can be smoothly raised.

In an embodiment of the invention, the retreat height for the vertically movable work platform is preferably adjacent an upper end in the rack vertical direction of the travel space located forwardly of the article storage rack, and the work height is preferably at a vertically intermediate location in the rack vertical direction in the travel space. And the article storage rack preferably includes an entrance for entering and exiting the travel space, and a maintenance door for opening and closing the entrance and the one or more of winding rotating bodies are preferably provided above the entrance in the article storage rack. And a vertical movement operating member operatively connected to the one or more winding rotating bodies and configured to be manually rotated to rotate the one or more winding rotating bodies is preferably provided and located laterally of the entrance of the article storage rack.

In the conventional article storage facility, a plurality of suspension wires suspend and support the vertically movable work platform at two or more locations. And if the winding rotating body for feeds out a plurality of suspension wires is provided and located laterally of the entrance of the article storage rack, it would be easy for the operator who enters and exits the entrance to rotate the winding rotating body. However, it would be necessary to bring the suspension wires around to the point located laterally of the entrance. And the winding rotating body, which would have to have a large dimension in the direction of the axis to spool a plurality of suspension wires, would have to be placed laterally of the article storage rack, which is likely to crowd the area around the entrance.

On the other hand, with the configuration in the above-described embodiment of the present invention, since the one or more of winding rotating bodies are provided above the entrance in the article storage rack, and since the manually operated rotating operation portion which is operatively connected with the winding rotating body or bodies and which rotate the winding rotating body or bodies is provided so that it is located laterally of the entrance of the article storage rack, the winding rotating body or bodies is/are rotated—and thus the vertically movable work platform is moved vertically— by rotating the manually operated rotating operation portion located laterally of the entrance and it is easy for the operator who enters and exits the entrance to rotate the winding rotating body or bodies. And by placing the winding rotating body or bodies at a location above the entrance, the plurality of suspension wires need to be brought around only to the location above the entrance and not to the point located laterally of the entrance. And, the manually operated rotating operation portion provided in the location located laterally of the entrance can be operatively connected to the winding rotating body or bodies by spooling one wire, for example, and thus, can have a small dimension in the axial direction compared with the winding rotating body or bodies, which helps keep the area near the entrance uncrowded. Therefore, an article storage facility can be provided in which it is easy for the operator, who enters and exits the entrance, to rotate the winding rotating body or bodies while the area near the entrance can be kept uncrowded.

In an embodiment of the invention, the vertically movable work platform is preferably formed to be long in the rack lateral width direction, and a plurality of the winding rotating bodies are arranged in the rack fore and aft direction. And the vertically movable work platform is suspended and supported by a plurality of wires at both end locations in the rack lateral width direction.

That is, an article storage facility can be provided in which the vertically movable work platform can be suspended and supported with reduced swaying motion if any, because the vertically movable work platform which is formed to be long in the rack lateral width direction is suspended and supported by a plurality of wires at both end locations of the vertically movable work platform in the rack lateral width direction.

In an embodiment of the invention, a rotating operation rotating body that rotates in unison with the winding rotating bodies is preferably provided, and an operating wire fed out from a rotating body of a manually operated winch which functions as a vertical movement operating member is preferably wound around the rotating operation rotating body so that the operating wire is spooled by the rotating operation rotating body as the vertically movable work platform is lowered.

That is, since the winding rotating body or bodies is/are configured to be rotated by a rotating operation of the manually operated winch, the handling is improved when rotating the winding rotating body or bodies to vertically move the vertically movable work platform. And, since the operative connection with the rotating body or bodies is made through the operating wire, the load capacity is greater. Thus, an article storage facility can be provided in which handling is improved when rotating the winding rotating body or bodies to vertically move the vertically movable work platform and in which the load capacity is greater.

BRIEF DESCRIPTION OF THE DRAWINGS

FIGS. 16(a)-16(b) are a front view showing the stopper means in an alternate embodiment.

DESCRIPTION OF THE INVENTION

The preferred embodiment of the present invention is described with reference to the drawings.

Although a plurality of embodiments are described herein, a combination of a feature in one embodiment with a feature in a different embodiment is also considered to fall within the present invention.

Figure 1:
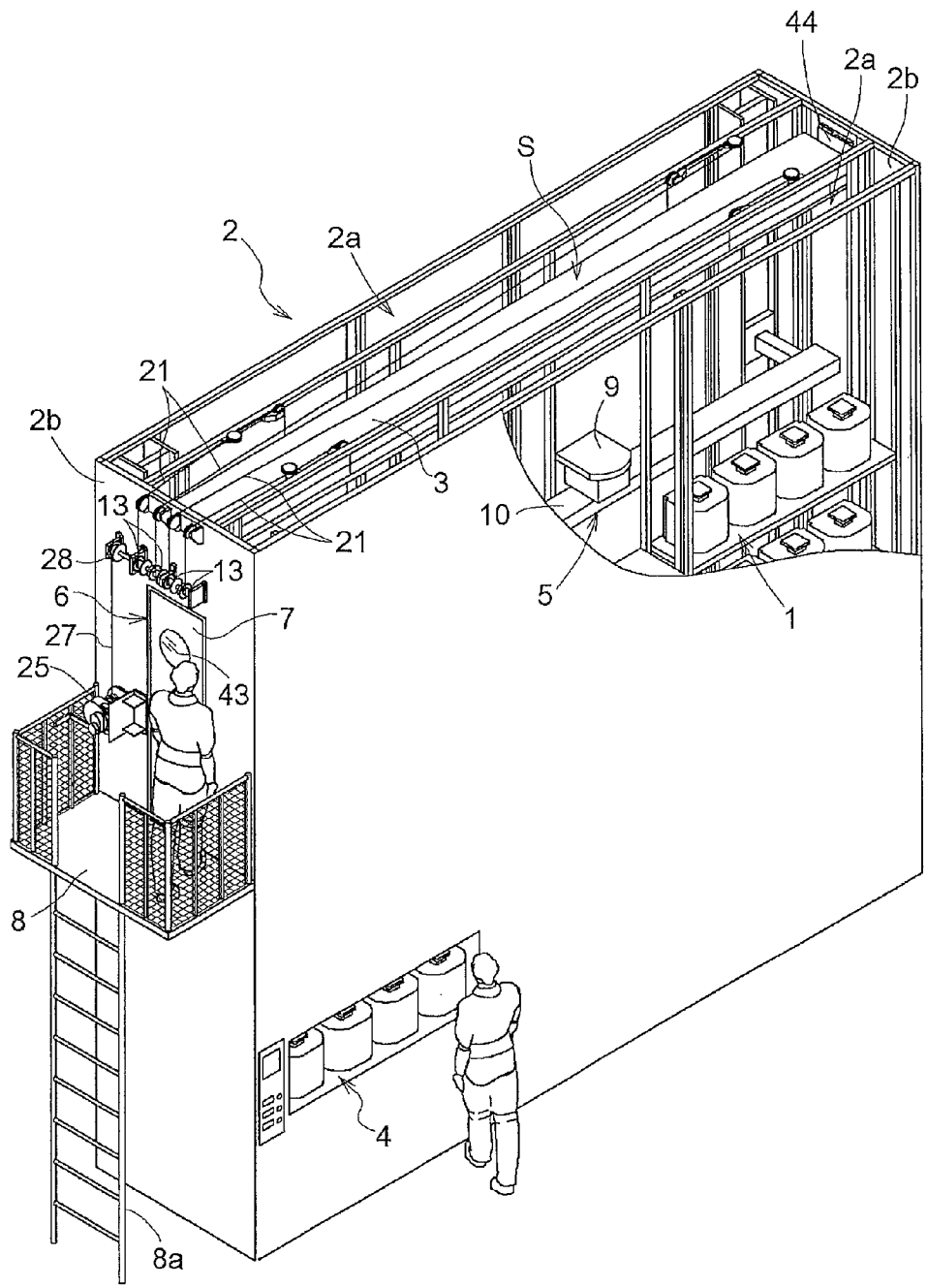
FIG. 1 is a perspective view of the article storage facility.
Figure 2:
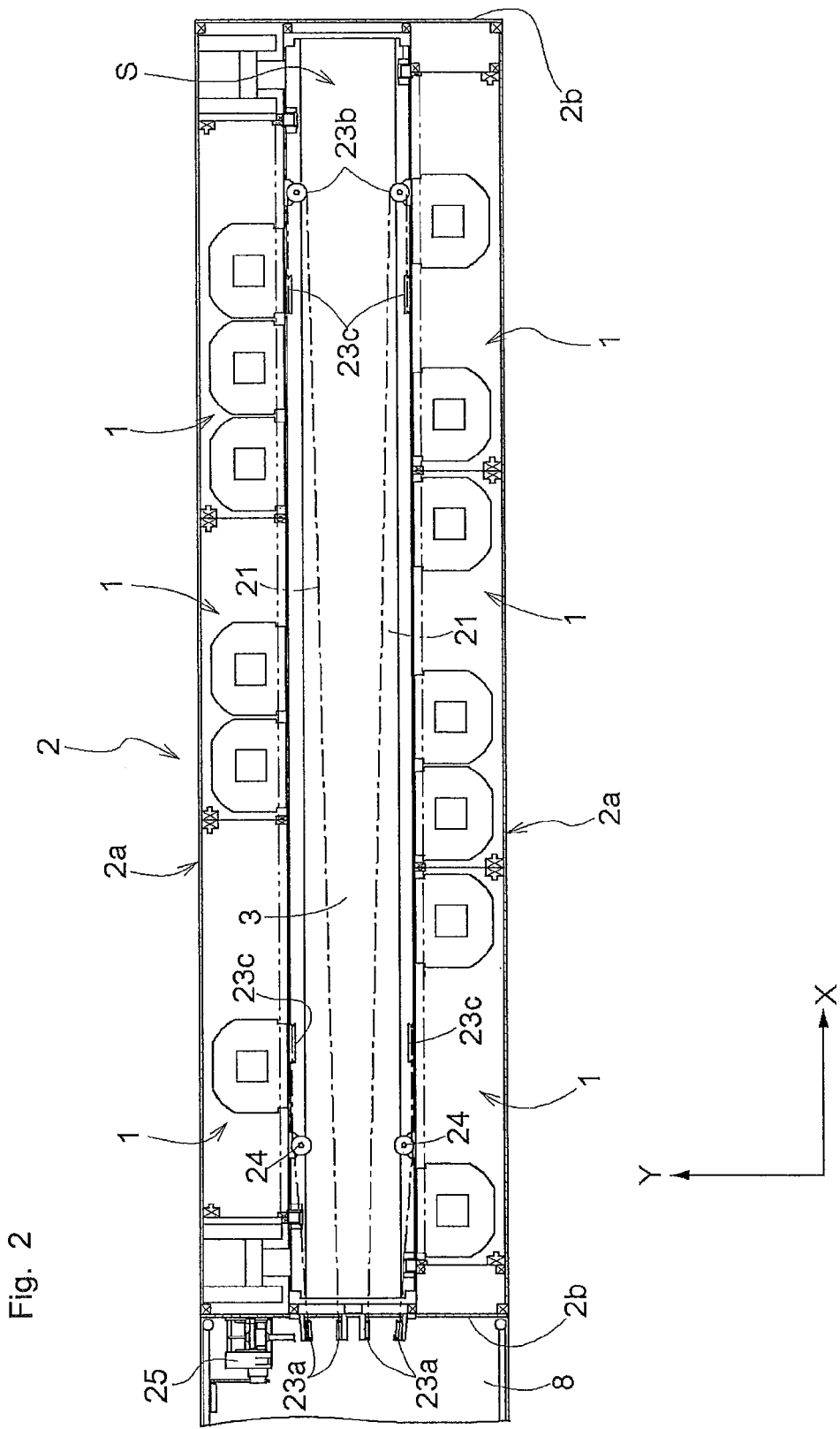
FIG. 2 is a plan view of the article storage rack.

As shown in FIGS. 1 and 2, the article storage facility includes an article storage rack 2 having a plurality of storage units for storing articles with the storage units being arranged in a rack vertical direction and in a rack lateral direction, a vertically movable work platform 3 which is configured to move in the rack vertical direction in the travel space S located forwardly of the article storage shelf 2, and a transport device 5 for transporting articles between the storage units 1 and article take-in-and-out portions 4.

In FIG. 2, the symbol X shows the direction along the rack lateral width direction, and Y shows the direction along the rack fore and aft direction.

The article storage rack 2 includes a pair of storage rack portions 2a which face each other, and the travel space S is formed between the pair of storage rack portions 2a.

And an area of the storage unit 1 located in a lower position of one of the storage rack portions 2a functions as a plurality of article take-in-and-out portions 4 arranged in the rack lateral width direction.

As shown in FIG. 1, the article storage rack 2 has an entrance 6 for allowing entrance to the travel space S and a maintenance door 7 for opening and closing the entrance 6. More specifically, the article storage rack 2 has, on one of the pair of outer walls 2b that cover the travel space S on both end sides in the rack lateral width direction, the entrance 6 for getting on and off the vertically movable work platform 3 located at the work height, and the maintenance door 7 that can be opened and closed by pivoting it about a vertical axis such that the door 7 can close the entrance 6.

And located to one lateral side of the article storage rack 2 and at the height that corresponds to the entrance 6 is a platform or a landing 8 to which a ladder 8a is used to climb. And the landing 8 is configured so that one can get on and off the vertically movable work platform 3 located at the work height by entering the travel space S from the landing 8 through the entrance 6.

As shown in FIG. 1, the transport device 5 includes an article transfer device 9 for transferring an article to each storage unit 1, and a vertically movable frame 10 which can move in the rack vertical direction in the travel space S, and which supports the article transfer device 9 such that the device 9 can move in the rack lateral width direction. Incidentally, the article transfer device 9 has a fork device that can pivot about a vertical axis, and is configured to be able to transfer an article to each storage unit 1 in either of the pair of storage rack portions 2a.

Figure 3:
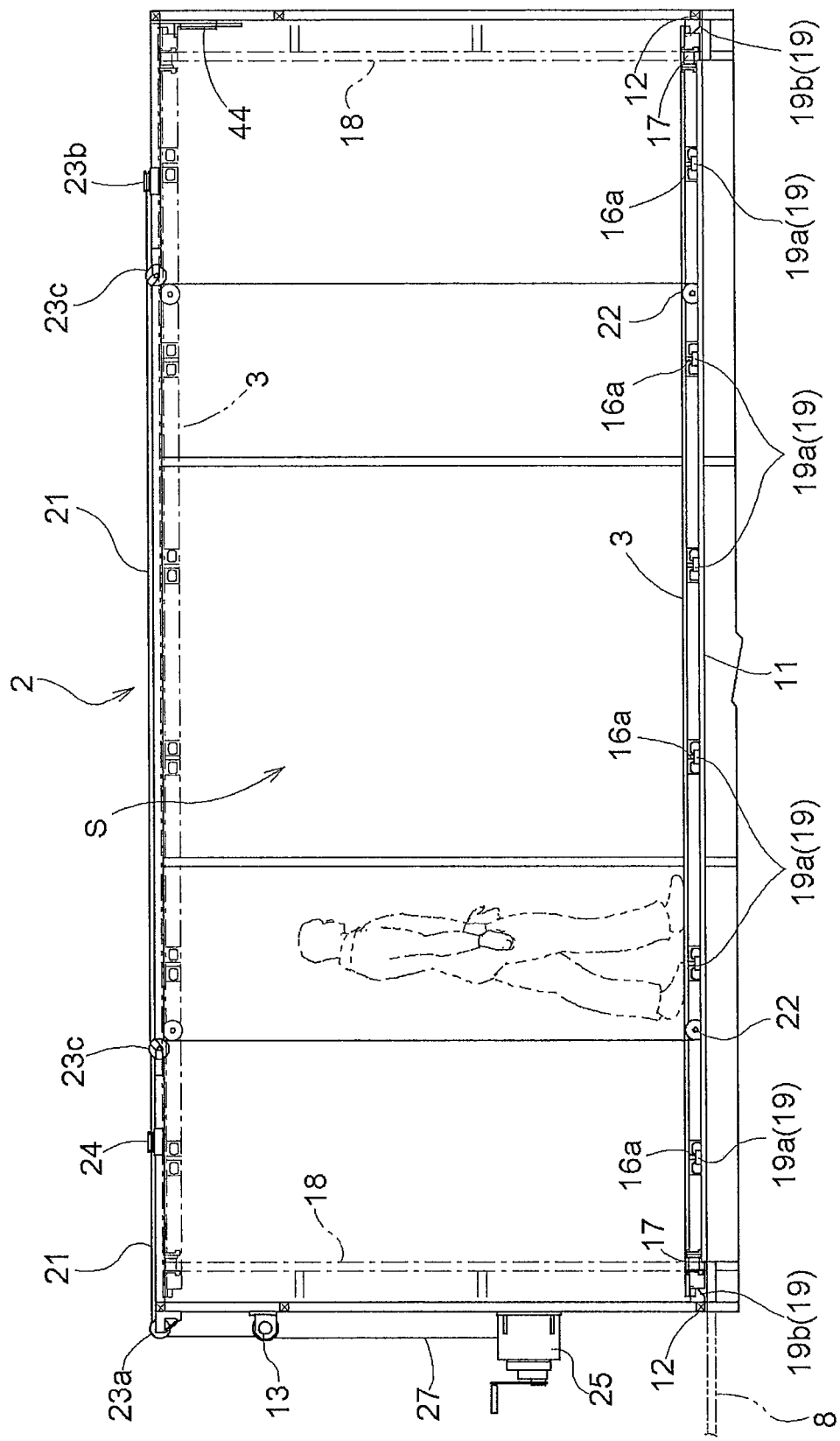
FIG. 3 is a plan view showing an upper portion of the article storage rack.

As shown in FIG. 3, the vertically movable work platform 3 is suspended and supported at two or more locations by a plurality of suspension wires 14 fed out from winding rotating bodies 13, which can be rotated. The vertically movable work platform 3 is configured to move vertically along the article storage rack 2, by rotations of the winding rotating bodies 13 in forward and opposite directions, between a retreat height at an upper end or a location close to the upper end in the rack vertical direction in the travel space S and the work height at an intermediate location in the rack vertical direction in the travel space S. The vertical movement support means to support the vertically movable work platform 3 for vertical movements is constituted by one or more winding rotating bodies 13 and the suspension wires 14.

Figure 4:
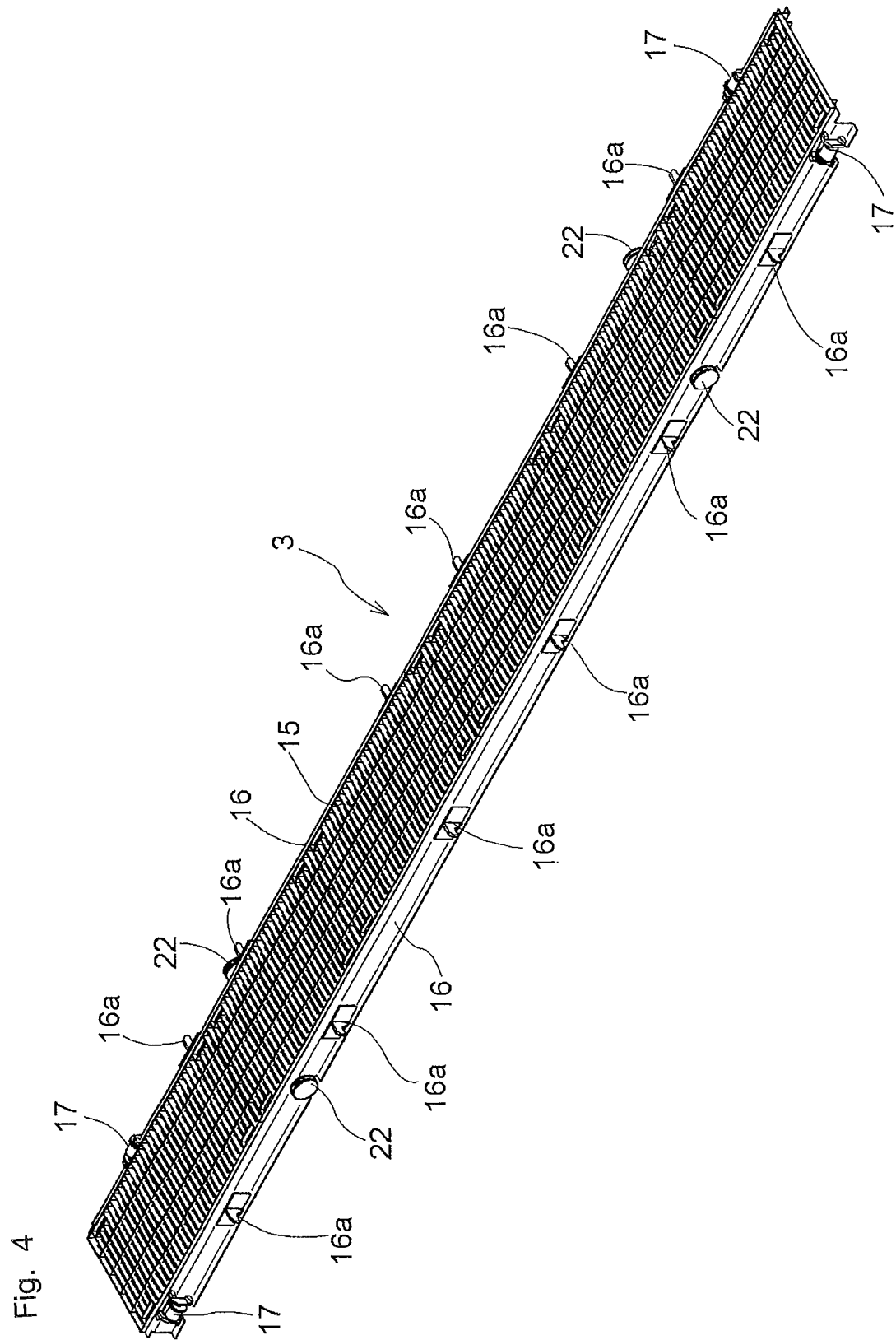
FIG. 4 is a perspective view of the vertically movable work platform.
Figure 5:
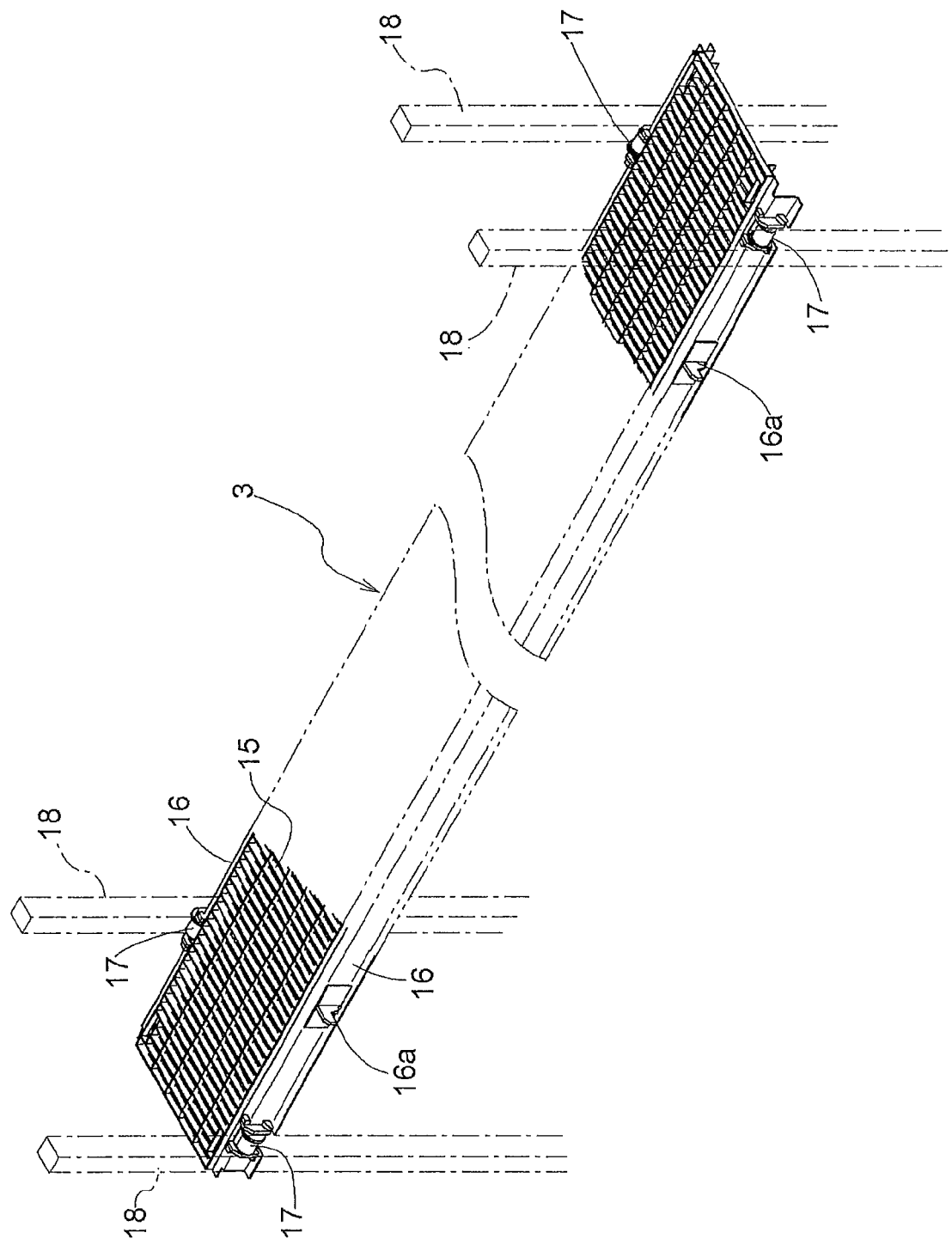
FIG. 5 is a perspective view showing guide rails and guide rollers of the vertically movable work platform.

And as shown in FIGS. 4 and 5, the vertically movable work platform 3 includes a work platform portion 15 which is rectangular in plan view, and a supported frame portion 16 connected to each of the both ends of this work platform portion 15 in the rack fore and aft direction. The vertically movable work platform 3 is long in the rack lateral width direction. And each of the work platform portions 15 and the pair of the supported frame portions 16 has approximately the same length as the width of the travel space S in the rack lateral width direction.

Incidentally, the retreat height (shown with solid lines in FIG. 3) is higher than the upper end of the vertical movement range in which the transport device 5 is moved vertically. And the work height (shown with dotted lines in FIG. 3) is located at an intermediate position of the vertical movement range in which the transport device 5 is moved vertically. By moving the vertically movable work platform 3 to the retreat height, the transport device 5 can be moved vertically over the entire range of the vertical movement range. And by lowering the transport device 5 to below the intermediate position of the vertical movement range, the vertically movable work platform 3 can be moved vertically between the work height and the retreat height.

As shown in FIGS. 3 and 5, guide rails 18 are provided which guide the guide rollers 17, acting as guide portions provided to the vertically movable work platform 3, along the vertical direction. The guide rollers 17 or the guide rails 18 are configured to restrict movements of the guide roller 17 in the horizontal direction.

To describe in more detail, the guide rollers 17 are provided to each of the pair of supported frame portions 16 of the vertically movable work platform 3 at both ends in the rack lateral width direction with the guide rollers 17 projecting outwardly in the rack fore and aft direction from the supported frame portions 16. The guide rails 18 are provided to each of the storage rack portions 2a in the article storage rack 2 at locations that correspond to the guide rollers 17, so as to extend in the vertical direction. And the vertically movable work platform 3 is configured to move vertically along the article storage rack 2 while the guide rollers 17 are guided along the vertical direction, with their horizontal movements restricted, by the guide rails 18 by virtue of the fact that the guide rollers 17 are located between the guide rails 18 arranged in the rack fore-and-aft direction, and of the fact that the guide rollers 17 have ribs for restricting outward movements in the rack lateral width direction.

Figure 6:
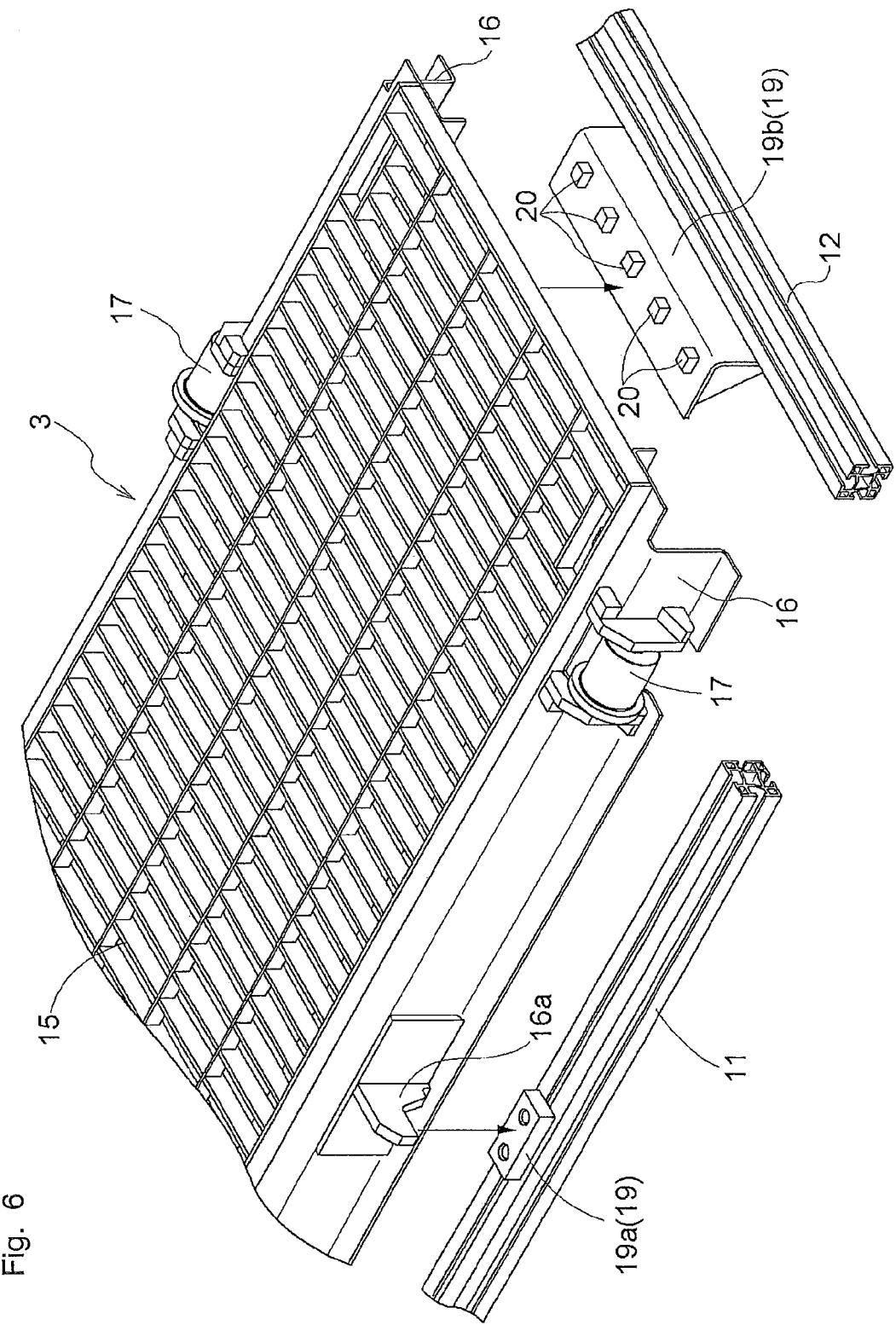
FIG. 6 is a perspective view showing an intermediate portion support and an end portion support.

As shown in FIG. 6, supports 19 which receive and support, at the work height, the vertically movable work platform 3 which is being lowered are provided in the article storage rack 2.

And provided as the supports 19 are intermediate portion supports 19b which receive and support the intermediate portions in the rack lateral width direction of the supported frame portions 16, and end portion supports 19a which receive and support the end portions in the rack lateral width direction of the supported frame portions 16.

Figure 7:
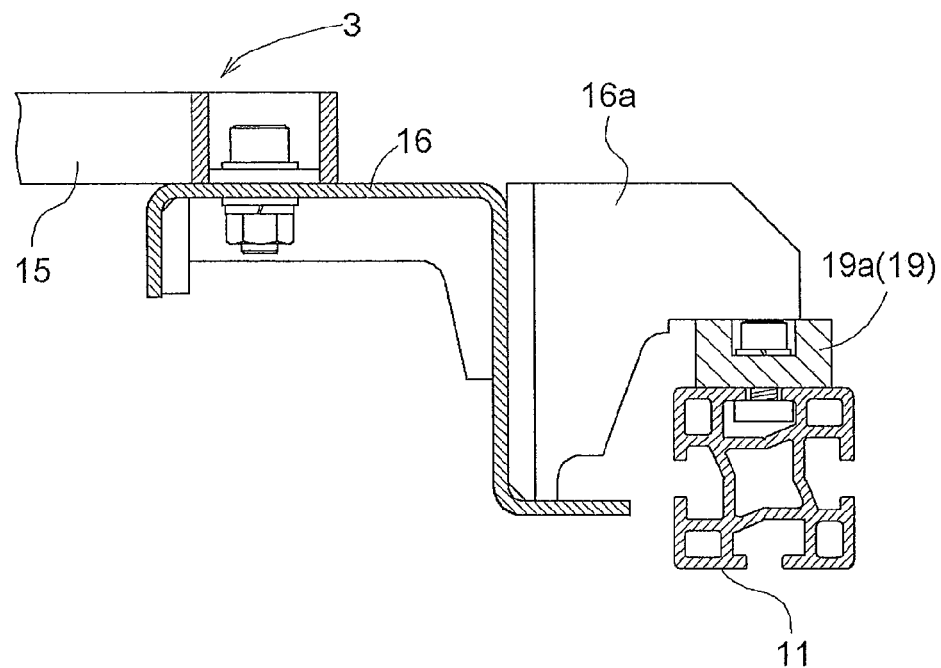
FIG. 7 is a vertical sectional elevational view showing the intermediate portion support.

As shown in FIGS. 6 and 7, each intermediate portion support 19a is a block-shaped member fixedly attached to a transverse frame 11 extending in the rack lateral width direction, and is configured to support a plate-shaped member 16a provided to the supported frame portion 16 such that the plate-shaped member 16a projects outwardly from this supported frame portion 16 in the rack fore and aft direction. The intermediate portion support 19a has an upper surface which extends approximately horizontally. The plate-shaped member 16a has a flat shape which generally extends in the vertical direction, and is configured such that its bottom surface abuts the approximately horizontally extending upper surface of the intermediate portion support 19a. A slot which extends along the rack lateral width direction is formed in at least one surface, of the transverse frame 11, that extends in the rack lateral width direction. The intermediate portion support 19a is fixed to the transverse frame 11 through this slot.

Figure 8:
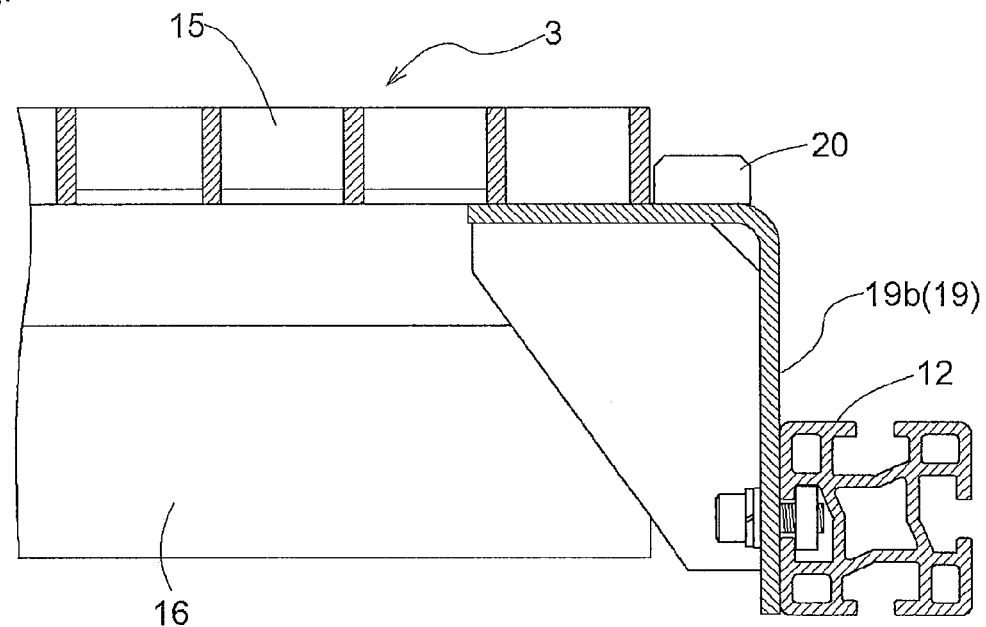
FIG. 8 is a vertical sectional side view showing the end portion support.

And, as shown in FIGS. 6 and 8, each of the end portion supports 19b is a plate-shaped member formed by bending it into an L-shape, and is fixedly attached to a fore and aft frame 12 extending in the rack fore-and-aft direction. The end portion supports 19b are configured to received and supported the ends, with respect to the rack lateral width direction, of the work platform portion 15. A plurality of upwardly projecting protruding portions 20 provided to each end portion support 19b abuts the end portion, in the rack lateral width direction, of the work platform portion 15 to prevent the vertically movable work platform 3 located at the work height from moving in the rack lateral width direction. A slot which extends along the rack fore and aft direction is formed in at least one surface, of the fore and aft frame 12, that extends in the rack fore and aft direction. The end portion support 19b may be fixed to the transverse frame 11 through this slot.

Incidentally, each of the supports 19 is provided in the area outside, in horizontal directions, of the vertical travel path of the transport device 5 so that it does not interfere with the transport device 5 which moves vertically.

Figure 9:
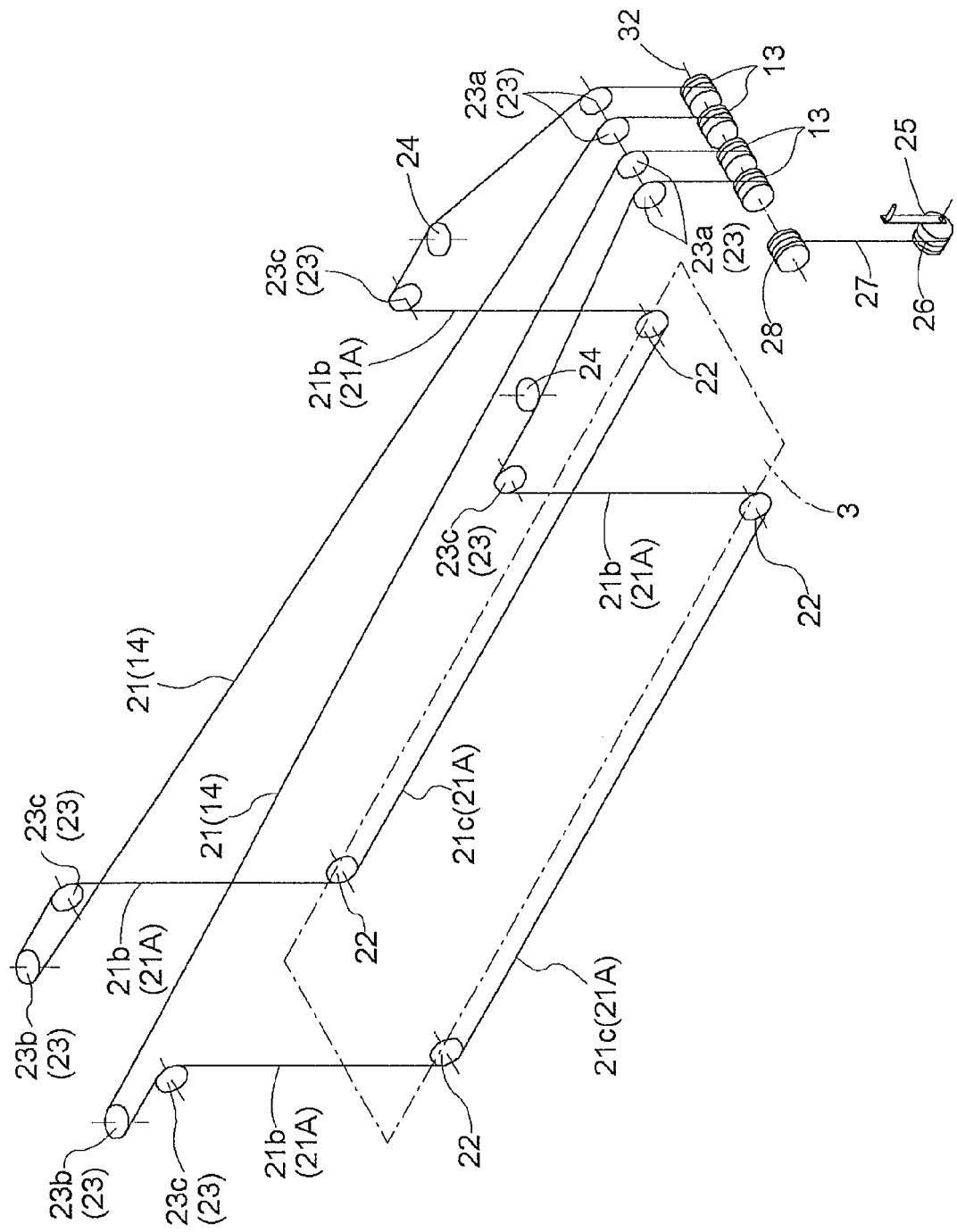
FIG. 9 is a perspective view showing the suspension wires.

As shown in FIG. 9, the suspension wire 14 has two looped wires 21. Each of the looped wires 21 has a suspending support portion 21A including a pair of downwardly oriented portions 21b and a horizontally oriented portion 21c which connects the lower end portions of the pair of downwardly oriented portions 21b. Each wire 21 is fed out from the corresponding winding rotating body 13 to change the feed out amount. A first pair of wire guiding rotating bodies 22 that are spaced apart in the rack lateral width direction is provided on one side of the vertically movable work platform 3 with respect to the rack fore and aft direction. And a second pair of wire guiding rotating bodies 22 that are spaced apart in the rack lateral width direction is provided on the other side of the vertically movable work platform 3 with respect to the rack fore and aft direction. The suspending support portion 21A in each of these two looped wires 21 are wound around or run over respective one of the first and second pairs of the wire guiding rotating bodies 22. Incidentally, each of the looped wire 21 is made into the shape of a loop by virtue of the fact that one end portion and the other end portion are wound around the winding rotating bodies 13.

To describe in more detail, a pair of wire guiding rotating bodies 22 are separated and provided in both end regions in the rack lateral width direction in the vertically movable work platform 3. And this pair of wire guiding rotating bodies 22 is provided on one side as well as on the other side with respect to the rack fore and aft direction in the vertically movable work platform 3. That is, a wire guiding rotating body 22 is provided at each end portion, with respect to the rack lateral width direction, of the two supported frame portions 16 that form one side portion and the other side portion of the vertically movable work platform 3.

And, two or more guiding rotating bodies 23 for guiding each looped wire 21 are provided in the upper end portion of the article storage rack 2. Provided as these guiding rotating bodies 23 are a pair of horizontally guiding rotating bodies 23a provided on the same side as the winding rotating bodies 13 with respect to the rack lateral width direction to guide into the horizontal direction the looped wires 21 fed out upwardly from the winding rotating bodies 13, a turning around guiding rotating body 23b which is provided on the opposite side from the winding rotating bodies 13 with respect to the rack lateral width direction and which guides the looped wire 21 to turn it around to the opposite direction, and a pair of downwardly guiding rotating bodies 23c provided between the horizontally guiding rotating body 23a and the turning around guiding rotating body 23b to guide into a downward direction the portion of the looped wire 21 located between one of the pair of horizontally guiding rotating bodies 23a and the turning around guiding rotating body 23b. And two sets of five guiding rotating bodies 23—the pair of horizontally guiding rotating bodies 23a, the turning around guiding rotating body 23b, and the pair of downwardly guiding rotating bodies 23c—are provided to one side and the other side in the rack lateral width direction in the upper end portion of the article storage rack 2.

And, tensioning rotating bodies 24 for providing tension to the looped wires 21 are provided on one side and the other side in the upper end portion of the article storage rack 2.

That is, each of the two looped wires 21 is wound around or run over a pair of wire guiding rotating bodies 22 and five guiding rotating bodies 23 described above such as to define a suspending support portion 21A including a pair of downwardly oriented portion and a horizontally oriented portion 21c which connects the lower end portions of these downwardly oriented portions 21b. The suspending support portion 21A located between the pair of downwardly guiding rotating bodies 23c in the looped wire 21 is run over lower portions of the pair of wire guiding rotating bodies 22.

Incidentally, the portion of the looped wire 21 that extends in the vertical direction from the downwardly guiding rotating body 23c to the wire guiding rotating body 22 corresponds to the downwardly oriented portion 21b, and the portion of the looped wire 21 that is located between the pair of wire guiding rotating bodies 22 and that extends in the rack lateral width direction corresponds to the horizontally oriented portion 21c.

As shown in FIG. 1, the winding rotating bodies 13 are provided at locations above the entrance 6 of the article storage rack 2. Provided as these winding rotating bodies 13 are four winding rotating bodies 13 which include the first winding rotating body 13 that spools one end of one of the looped wires 21, the second winding rotating body 13 that spools the other end of the one of the looped wires 21, the third winding rotating body 13 that spools one end of the other of the looped wires 21, and the fourth winding rotating body 13 that spools the other end of the other of the looped wires 21, and which are provided at locations above the entrance 6 on an external surface of the outer wall 2b of the article storage rack 2 such that the drums 13 are arranged in the rack fore-and-aft direction.

Figure 10:
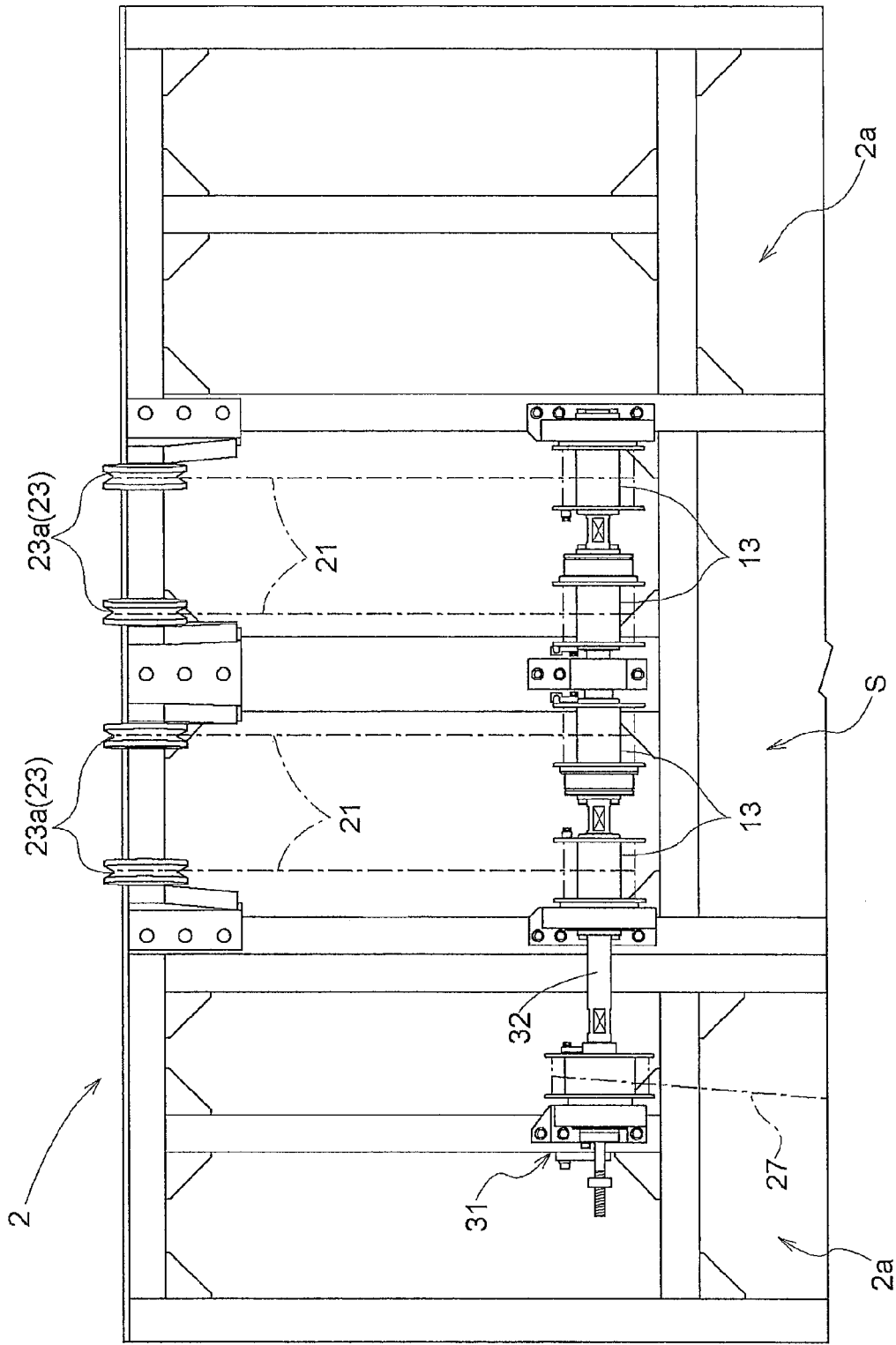
FIG. 10 is a front view showing the upper part of the article storage rack.

And while detailed explanation is omitted, as shown in FIG. 10, the four winding rotating bodies 13 are operatively connected so that they are rotated in unison by a pivot shaft 32. And each of the four winding rotating bodies 13 is configured such that each can be rotated independently by disengaging it from the pivot shaft 32.

As shown in FIG. 1, provided at a position located laterally of the entrance 6 of the article storage rack 2 is a winch 25 that is operatively connected to the winding rotating bodies 13 and that functions as a vertical movement operating member or a rotating operation portion of a manual operation type for rotating the winding rotating bodies 13. More specifically, as shown in FIG. 3, a rotating operation rotating body 28 is provided which spools an operating wire 27 fed out from a rotating body 26 of the manually operated winch 25 and which feeds out the operating wire 27 to be spooled by the rotating body 26 of the winch 25. And the winding rotating bodies 13 are configured to rotate in unison with the rotating operation rotating body 28, and thereby, the winch 25 is operatively connected with the winding rotating bodies 13.

The rotating operation rotating body 28 is provided on the external surface of the outer wall 2b of the article storage rack 2 at a location to one side and above the entrance 6.

That is, when the operator operates the winch 25 to spool the operating wire 27 around the rotating body 26, the winding rotating bodies 13 are rotated to spool the suspension wires 14 as the rotating operation rotating body 28 is rotated in such a direction as to feed out the operating wire 27. And as the length of the suspending support portions 21A becomes shorter as the fed-out amount of the two looped wires 21 becomes smaller, the vertically movable work platform 3 is pulled up and raised by the suspension wires 14.

And, when the operator operates the winch 25 to feed the operating wire 27 out from the rotating body 26, the winding rotating bodies 13 are rotated to feed out the suspension wires 14 as the rotating operation rotating body 28 is rotated in such a direction as to spool the operating wire 27. And as the length of the suspending support portions 21A becomes longer as the fed-out amount of the two looped wires 21 becomes greater, the vertically movable work platform 3 is lowered under its own weight with the increase in the length of the suspending support portions 21A.

Figure 11:
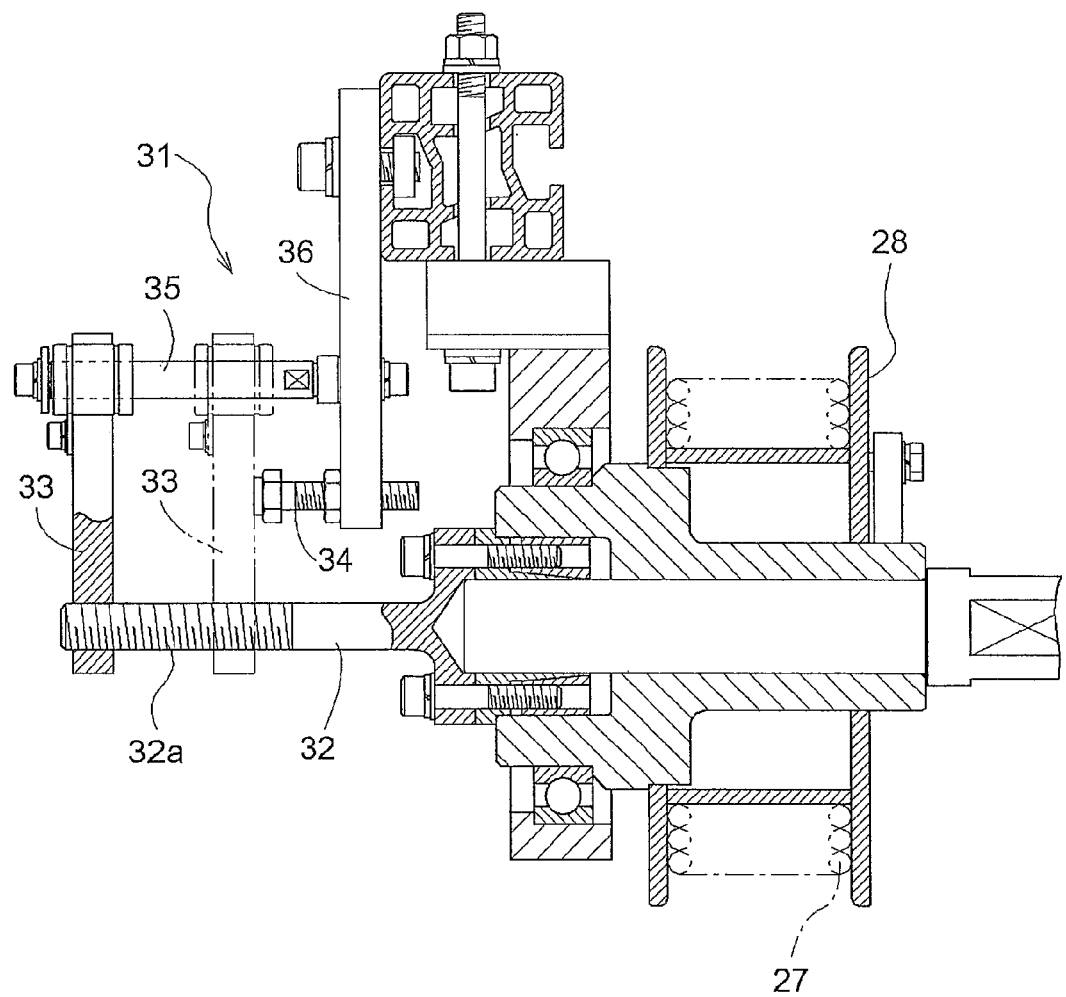
FIG. 11 shows the stopper means.

As shown in FIG. 11, stopper means 31 is provided to prevent the rotation of the winding rotating bodies 13 in the direction that tends to lower the vertically movable work platform 3 when the vertically movable work platform 3 reaches the work height. The stopper means 31 consists of a movable body 33 which meshes with the pivot shaft 32 that rotates in unison with the winding rotating bodies 13 and which moves in the direction of the axis of the pivot shaft 32 as the winding rotating bodies 13 rotate, and a receiving body 34 which restricts the moving range of the movable body 33 along the direction of the pivot shaft to the range at which the vertically movable work platform 3 reaches the work height.

To describe the stopper means 31 in more detail, the stopper means 31 is provided on the opposite side of the rotating operation rotating body 28 from the side in which the winding rotating bodies 13 are located. The movable body 33 for the receiving body 34 has a proximal end portion which fits onto the pivot shaft 32 extending parallel to a guiding shaft 35 such that the proximal end portion can slide along the axis of the shaft 35 and can rotate, and also has a distal end portion which is meshed with a threaded part 32a in the pivot shaft 32.

And as the pivot shaft 32 rotates as the result of the rotations of the rotating operation rotating body 28 and the winding rotating bodies 13, the movable body 33 is rotated relative to the pivot shaft 32 and is slid along the direction of the axis of the guiding shaft 35. And when the movable body 33 reaches the position in the slide moving range of the movable body 33 which corresponds to the work height for the vertically movable work platform 3, the receiving body 34 abuts—and restricts further movement of—an intermediate portion located between the proximal end portion and distal end portion of the movable body 33, thus restricting the further rotation of the winding rotating bodies 13 in the direction that tends to lower the vertically movable work platform 3.

And, the receiving body 34 is configured to have a screw portion which meshes with a supporting plate 36, and thus the receiving body 34 is configured to be moved along the direction of the axis by rotating it. The position at which the receiving body 34 abuts the movable body 33 can be adjusted along the direction of the axis of the guiding shaft 35 so that the receiving body 34 can receive and restrict the movement of the movable body 33 when the vertically movable work platform 3 is lowered to the work height even if the suspension wires 14 stretch.

Figure 12:
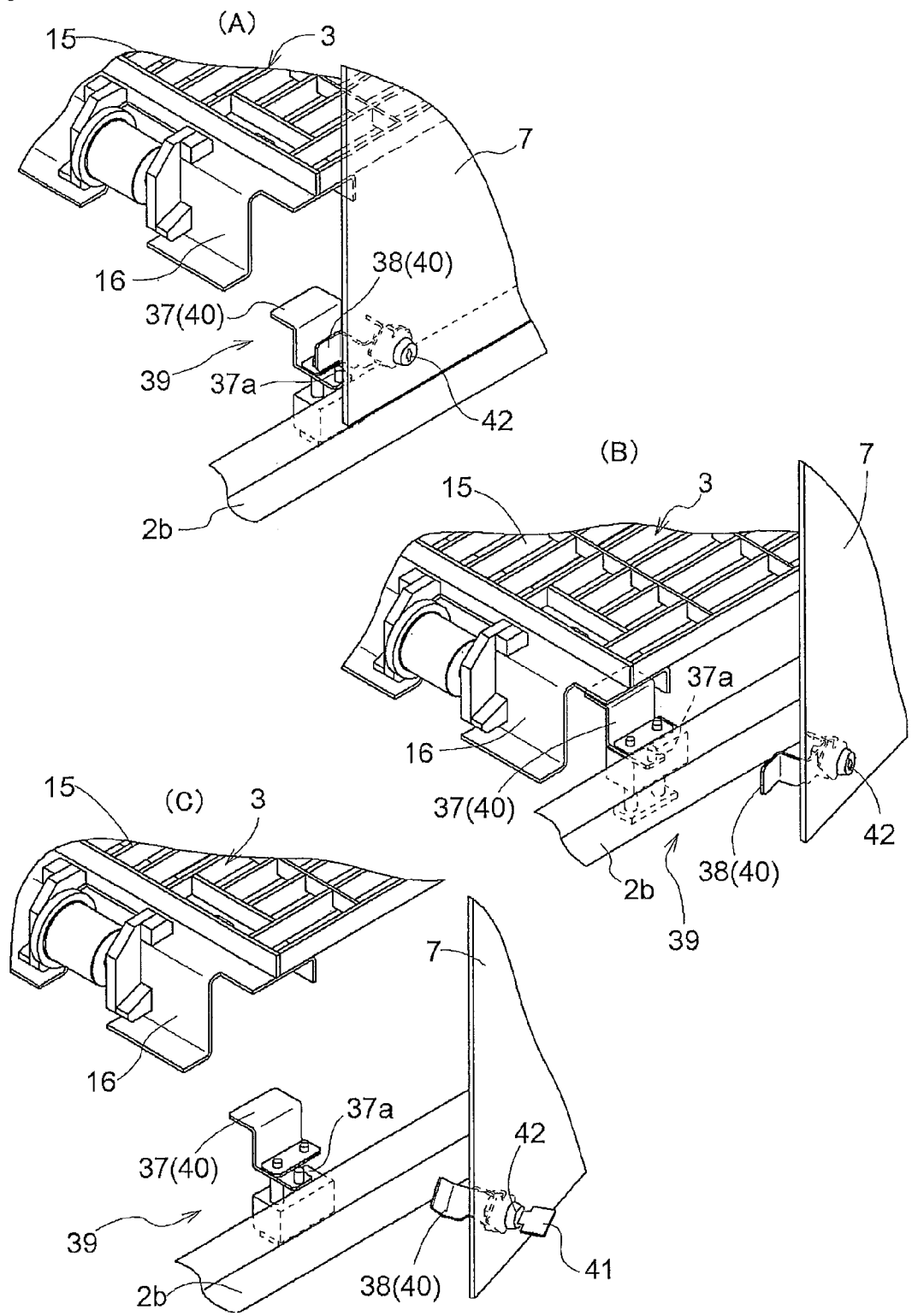
FIG. 12 shows the door opening prevention means.

As shown in FIG. 12, door opening prevention means 39 is provided for allowing the maintenance door 7 to be opened when the vertically movable work platform 3 is located at the work height or a height close to it, and for preventing the maintenance door 7 from being opened when the vertically movable work platform 3 is located above the work height or the height close to it.

The door opening prevention means 39 includes a preventing body 40 which can be switched between a permitting attitude (FIGS. 12 (B) and (C)) for allowing the maintenance door 7 to be opened and a preventing attitude (FIG. 12 (A)) for preventing opening. A preventing body 40 is elastically urged toward the preventing attitude, and is located in the vertical travel path of the vertically movable work platform such that the preventing body 40 is pressed into the permitting attitude (FIG. 12 (B)) by the lowering movement of the vertically movable work platform 3 when the vertically movable work platform 3 is located at the work height or a height close to it, and is released from the pressing force from the vertically movable work platform 3 when the vertically movable work platform 3 is located above the work height or a height close to it so that the preventing body 40 is elastically returned to the preventing attitude.

And, an operating key 41, that functions as a manually operating element for changing the attitude or orientation of the preventing body 40 to the permitting attitude (FIG. 12 (C)) and to the preventing attitude (FIG. 12 (A)), is removably provided in an insert portion 42 which faces the exterior of the travel space S (that is, the insert portion 42 can be accessed from outside). That is, the preventing body 40 is configured to be able to be switched to an emergency release attitude as shown in FIG. 12 (C) which can be effected by manipulating the operating key 41, in addition to the usual release attitude to which the preventing body 40 is switched by the lowering movement of the vertically movable work platform 3 as shown in FIG. 12 (B).

To describe the preventing body 40 in more detail, the preventing body 40 includes a vertical movement operation member 37 provided on one of the pair of outer walls 2b, and a pivot operation member 38 provided either on the inside face the maintenance door 7 or at the lower end of a lateral free end of the inside face to engage this vertical movement operation member 37.

And the pivot operation member 38 may be pivoted between a horizontal or approximately horizontal engage attitude, shown in FIGS. 12(A) and 12(B), in which the operating key 41 may be inserted to and removed from the insert portion 42, and an engage release attitude in which the pivot operation member 38 is tilted such that its distal end portion is located above its proximal end portion as shown in FIG. 12(C), and in which the operating key 41 inserted into the insert portion 42 may not be pulled out or disengaged. This pivoting of the pivot operation member 38 is performed by the operating keys 41 which has been inserted into the insert portion 42.

In addition, the vertical movement operation member 37 may be moved vertically between a lower position, shown in FIG. 12(B), which the vertical movement operation member 37 reaches as the result of being pressed down by the supported frame portion 16 of the vertically movable work platform 3 against the elastic urging force, and an upper position, shown in FIGS. 12(A) and 12(C), which the vertical movement operation member 37 reaches as the result of being raised by the elastic urging force after being released from the pressing-down force from the supported frame portion 16 of the vertically movable work platform 3. This vertical movement of the vertical movement operation member 37 is effected by the vertical movement of the vertically movable work platform 3.

Further, the vertical movement operation member 37 includes a projection 37a that projects upwardly from the main body of the vertical movement operation portion 37 such that it is located below the free end portion of the pivot operation member 38 in the engage attitude when the vertical movement operation member 37 is located in the lowered position and such that it is located at the same height as the free end portion of the pivot operation member 38 in the engage attitude when the vertical movement operation member 37 is located in the raised position.

Therefore, as shown in FIG. 12(A), when the vertically movable work platform 3 is raised to a position higher than the work height or a height close to it and the operating key 41 is removed from the insert portion 42, the vertical movement operation member 37 is located in the upper position and the pivot operation member 38 is switched to the engage attitude, so that the vertical movement operation member 37 engages with the pivot operation member 38, placing the preventing body 40 in the preventing attitude. Therefore, the maintenance door 7 can not be opened because the free end portion of the pivot operation member 38 abuts the projection 37a of the vertical movement operation member 37.

And as shown in FIG. 12 (B), because the vertical movement operation member 37 is moved to the lowered position and moves away from the pivot operation member 38 when the vertically movable work platform 3 is lowered to the work height or a height close to it, the preventing body 40 is placed in the usual release attitude so that the maintenance door 7 can be opened.

And, as shown in FIG. 12 (C), because the pivot operation member 38 moves away from the vertical movement operation member 37 when the operating key 41 is inserted into the insert portion 42 and the pivot operation member 38 is pivoted by this operating key 41 to the engage release attitude, the preventing body 40 is placed in the emergency release attitude so that the maintenance door 7 can be opened.

As shown in FIG. 1, a checking window 43 for checking the height of the vertically movable work platform 3, and a display portion 44 which indicates that the vertically movable work platform 3 has been raised to the retreat height and which is located such that it can be visually checked from the checking window 43 are provided.

And the checking window 43 is provided to the maintenance door 7 provided in the position corresponding to one end of the travel space S in the rack lateral width direction, and the display portion 44 is provided in a position corresponding to the other end of the travel space S in the rack lateral width direction.

Figure 13:
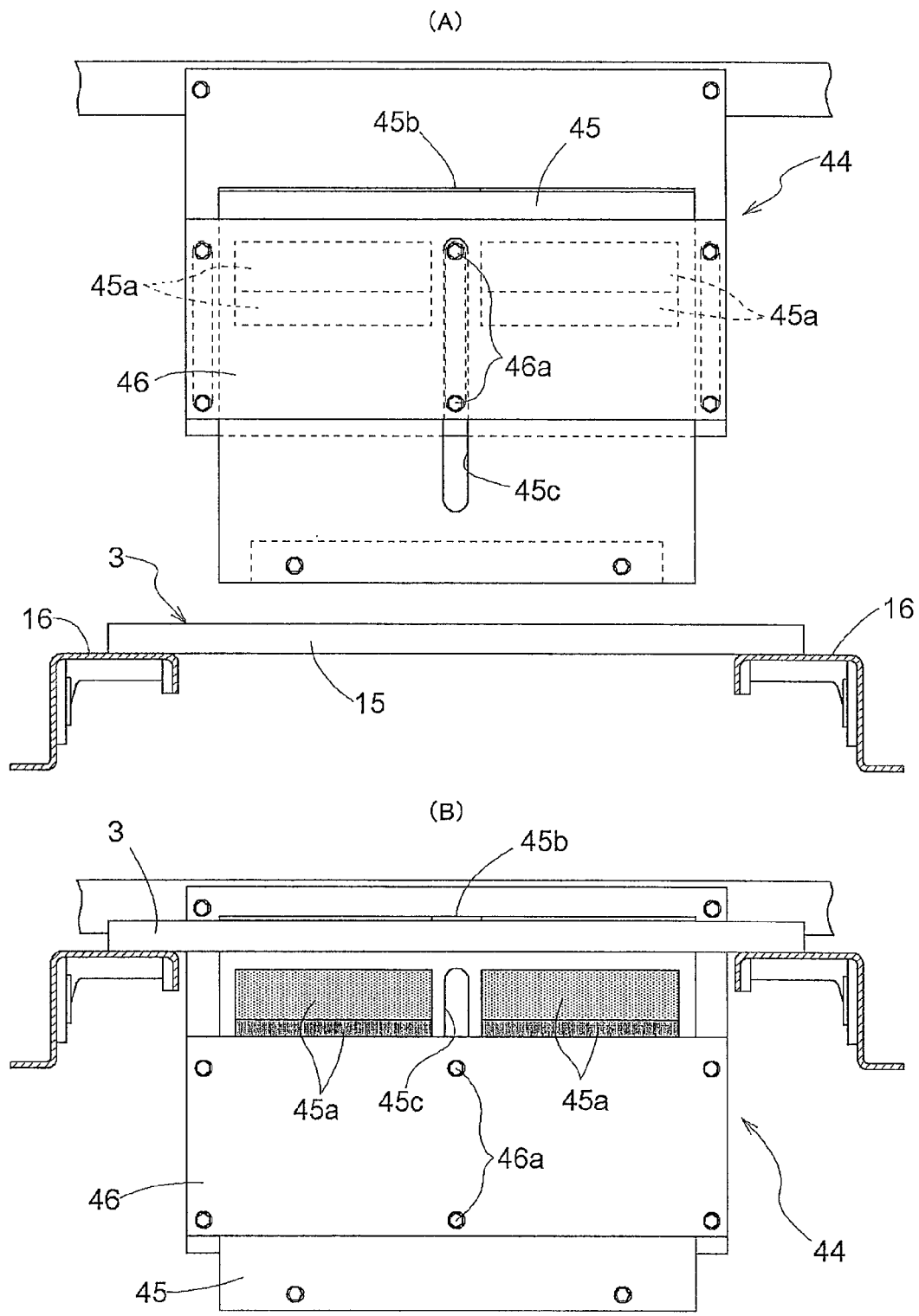
FIGS. 13(a)-13(b) are a sectional front view showing the display.
Figure 14:
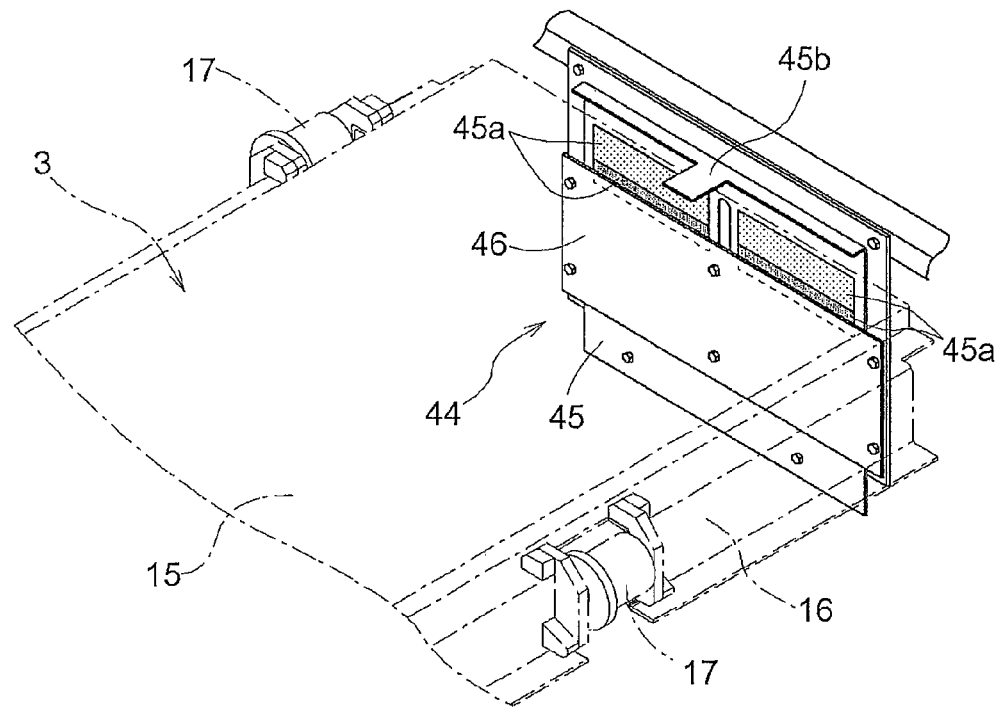
FIG. 14 is a perspective view showing the display.
Figure 15:
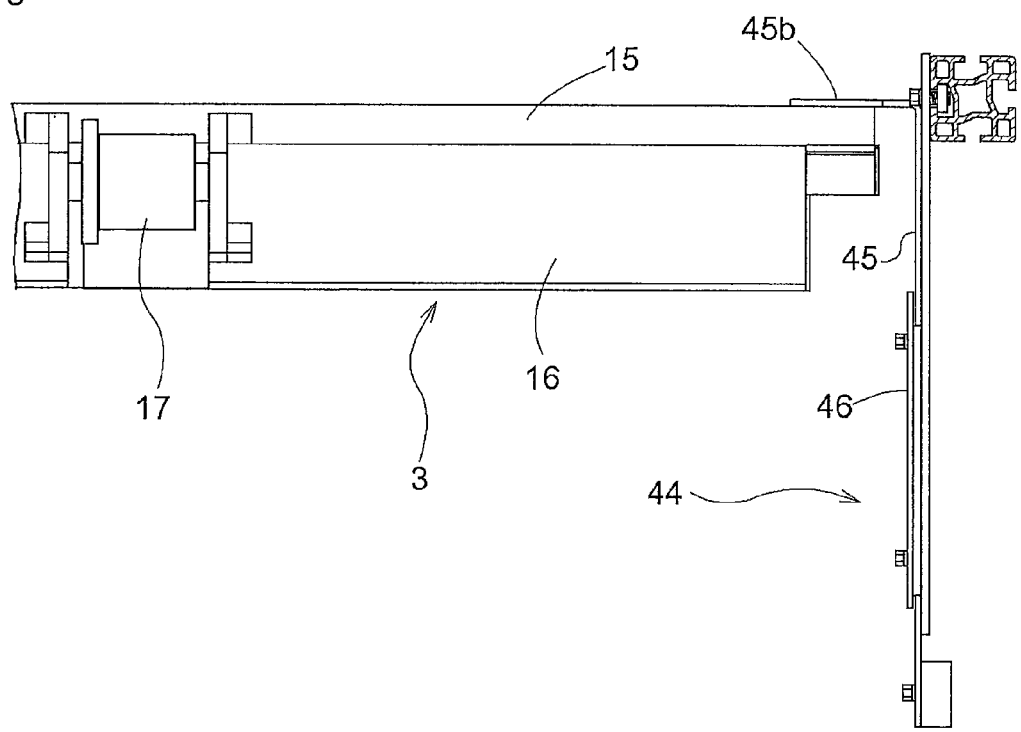
FIG. 15 is a side view showing the display.

As shown in FIGS. 13-15, the display portion 44 includes a display body 45 having a colored portion 45a for visual check, and a cover body 46 for covering the colored portion 45a for visual check. They are configured such that the colored portion 45a is exposed from the cover body 46 as the display body 45 of the display portion 44 is moved upwardly by engaging—and is lifted by—the raising vertically movable work platform 3. And the colored portion 45a is covered by the cover body 46 as the display body 45 is moved downwardly by engaging—and is lowered by—the lowering vertically movable work platform 3.

The colored portion 45a for visual check is colored such that it has different sections having different colors along the rack vertical direction of the display body 45. An engaged portion 45b for engaging the vertically movable work platform 3 is provided in a laterally central portion of the display body 45.

To describe in more detail, the display portion 44 includes the colored portion 45a in its upper portion of the plate-shaped main body portion. And the engaged portion 45b is formed in a laterally central portion in the upper end of the plate-shaped main body portion such that it projects horizontally toward where the vertically movable work platform 3 is located.

And the colored portion 45a is divided into strips or bands colored in two different colors with one above the other in the rack vertical direction: the upper portion of the colored portion 45a is colored green, and the lower portion is colored red. Incidentally, the colored portion 45a is colored such that the lower portion colored green in the colored portion 45a has a broader dimension in the rack vertical direction than the lower portion colored red.

And the cover body 46 is provided with a pair of—that is, an upper and lower—guide members 46a that extend through a slit-shaped guide hole 45c formed in the display body 45 on the inside at a laterally central location and extending in the vertical direction. The movement of the display body 45 in the rack vertical direction is guided by the upper and lower pair of guide members 46a. And the display body 45 is supported by the upper guide member 46a when the upper guide member 46a is located at the upper end of the guide hole 45c.

When the display body 45 is supported by the cover body 46 as described above, the entire colored portion 45a in the display body 45 is covered with this cover body 46. And the colored portion 45a is exposed above the cover body 46 as the display body 45 moves upwardly relative to the cover body 46, with the upper portion of the colored portion 45a exposed first, followed by the lower portion of the colored portion 45a.

That is, when the vertically movable work platform 3 is located at the work height or a height close to it, the vertically movable work platform 3 does not engage the engaged portion 45b of the display body 45; thus, the display body 45 is not lifted. Therefore, the display body 45 is supported by the cover body 46 where the entire colored portion 45a is covered by the cover body 46.

And, when the vertically movable work platform 3 is raised from the work height or a height close to it and approaches the retreat height or a height close to it, the vertically movable work platform 3 engages the engaged portion 45b of the display body 45. As the vertically movable work platform 3 is raised further from this height, the upper green portion in the colored portion 45a is exposed from the upper part of the cover body 46. Further raising of the vertically movable work platform 3 exposes the lower red portion in the colored portion 45a from the upper part of the cover body 46.

The state of this display portion can be viewed through the checking window 43.

Alternative Embodiments (1) In the embodiment described above, the stopper means 31 consists of the movable body 33 which meshes with the pivot shaft 32 which rotates in unison with the winding rotating bodies 13 and which moves in the direction of the axis of the pivot shaft 32 as the winding rotating bodies 13 rotate, and the receiving body 34 which restricts the moving range of the movable body 33 along the direction of the pivot shaft to the range at which vertically movable work platform 3 reaches the work height. However, the configuration of the stopper means 31 can be changed suitably.

More specifically, as shown in FIG. 16, the stopper means 31 may include an abutting member 51 fixed to the operating wire 27, and a wire accommodating element 52 which the operating wire 27 extends through and which receives and stops the abutting member 51 at the position where the vertically movable work platform 3 reaches the work height.

(2) In the embodiment described above, the rotating operation rotating body 28 is provided which spools the operating wire 27 fed out from the rotating body 26 of the manually operated winch 25 and which feeds out the operating wire 27 spooled by the rotating body 26, and the winding rotating bodies 13 are configured to rotate in unison with the rotating operation rotating body 28. However, the manually operated winch 25 may be configured to directly rotate the winding rotating bodies 13 without providing the operating wire 27 or the rotating operation rotating body 28.

(3) In the embodiment described above, the manually operated rotating operation portion consists of the manually operated winch 25, and the operating wire 27 fed out from the rotating body 26 of the winch 25 is wound around the rotating operation rotating body 28. However, the manually operated rotating operation portion may include a worm gear and a control lever which rotates the worm gear. And a toothed belt wound around the worm gear may be wound around the rotating operation rotating body.

(4) In the embodiment described above, the preventing body 40, which can be switched to the permitting attitude in which the maintenance door 7 is allowed to be opened and to the preventing attitude in which the opening operation is prevented, is elastically urged toward the preventing attitude, and is configured to be pressed down toward the permitting attitude by a lowering movement of the vertically movable work platform 3, and is returned toward the preventing attitude under the elastic urging force when released from the pressing down force from the vertically movable work platform 3. However, the preventing body 40 may be configured such that an engaging member provided to the vertically movable work platform 3 engages the preventing body 40 when the vertically movable work platform 3 is lowered to the work height or a height closed to it, and such that the preventing body 40 is switched to the permitting attitude and to the preventing attitude by engaging with the engaging member as the vertically movable work platform 3 is moved vertically at a height close to the work height.

And control means for controlling the operation of the operation means may be provided which can switch the preventing body 40 between the permitting attitude and the preventing attitude such that the preventing body 40 is switched to the permitting attitude when the vertically movable work platform 3 is lowered to the work height or a height close to it and to the preventing attitude when the vertically movable work platform 3 is raised from the work height or a height close to it, based on the detection result from height detection means for detecting the height of the vertically movable work platform 3.

(5) In the embodiment described above, the manually operating element 41 for switching the preventing body 40 between the permitting attitude and the preventing attitude is provided such that it can be removably inserted to the insert portion 42 which can be accessed from the exterior of the travel space S. And the preventing body 40 is switched between the permitting attitude and the preventing attitude by operating the manually operating element 41 through the insert portion 42. However, the manually operating element 41 may be provided in the exterior of the travel space S at a fixed position and the attitude change operation of the preventing body 40 may be directly effected to the permitting attitude and to the preventing attitude by operating the manually operating element. And, it is not necessary to provide either the manually operating element 41 or the insert portion 42.

And, in the embodiment described above, the pivot operation member 38 includes the manually operating element 41 and the vertical movement operation member 37 which was vertically moved by the vertical movement of the vertically movable work platform 3. However, it may be configured such that the manually operating element 41 vertically moves the vertical movement operation member 37 without providing the pivot operation member 38.

(6) In the embodiment described above, the checking window 43 is provided to the maintenance door 7 located at the position corresponding to one end side of the travel space S in the rack lateral width direction, and the display portion 44 is provided at a position corresponding to the other end of the travel space S in the rack lateral width direction. However, these checking window 43 and the display portion 44 can be located at any positions so long as the operator located outside the travel space S can visually check the display portion 44 from the checking window 43. For example, the checking window 43 may be provided to the outer wall 2b located in a position corresponding to one end side of the travel space S in the rack lateral width direction, and the display portion 44 may be located at a position corresponding to the central portion of the travel space S in the rack lateral width direction.

(7) In the embodiment described above, the display portion 44 is configured such that its colored portion 45a is exposed from the cover body 46 as the display portion 44 is engaged and lifted by the raising vertically movable work platform 3 and such that the colored portion 45a is covered by the cover body 46 as the display portion 44 is engaged and lowered by the lowering vertically movable work platform 3. However, the display portion 44 may be configured such that its colored portion 45a is exposed from the cover body 46 as the display portion 44 is engaged and lifted by the raising vertically movable work platform 3 and such that the colored portion 45a is covered by the cover body 46 as the display portion 44 is engaged and lowered by the lowering vertically movable work platform 3.

(8) In the embodiment described above, the display portion 44 consists of the display body 45 having the colored portion 45a for visual check and the cover body 46 for covering the colored portion 45a for visual check. However, the display portion 44 may consist only of the display body 45 without the cover body 46 such that the display body 45 is exposed from the lower portion of the raising vertically movable work platform 3 and is covered by the lowering vertically movable work platform 3.

(9) In the embodiment described above, the colored portion 45a of the display body 45 for visual check has separate sections colored in two different colors with one color above the other in the rack vertical direction. However, the colored portion 45a for visual check may be colored in a single color or may have three or more colored sections.

(10) In the embodiment described above, the engaged portion 45b for abutting the vertically movable work platform 3 is provided to a lateral central part of the display body 45. However, the size and the position of the engaged portion 45b may be changed suitably. For example, the engaged portion 45b may extend over the entire or approximately entire lateral length of the display body 45. And, the engaged portion 45b may be provided at a lateral end in the display body 45.

(11) In the embodiment described above, the winding rotating bodies 13 are arranged in the rack fore and aft direction, and both lateral end portions of the vertically movable work platform 3 are suspended and supported by a plurality of wires 14. However, a single winding drum 13 may be provided, and one lateral end portion or the central portion of the vertically movable work platform 3 may be suspended and supported by the single wire 14.

(12) In the embodiment described above, the vertically movable work platform 3 is long in the rack lateral width direction. However, the vertically movable work platform 3 may be long in the rack fore and aft direction. Or, the vertically movable work platform 3 may be formed such that its length in the rack lateral width direction is similar to or same as its length in the rack fore and aft direction.

INDUSTRIAL APPLICABILITY

The utilization of an article storage facility in accordance with the present invention may take various forms as a facility for storing various articles.

The invention claimed is:

1. An article storage facility comprising:
    an article storage rack having a plurality of storage units for storing articles, the storage units being arranged in a rack vertical direction and in a rack lateral width direction;
    a vertically movable work platform configured to move vertically between a retreat height and a work height in the rack vertical direction in a travel space located forwardly of the article storage rack;
    one or more winding rotating bodies manually operated directly or indirectly, wherein the vertically movable work platform is configured to be suspended and supported by a plurality of suspension wires fed out from the one or more winding rotating bodies and to be moved vertically by a rotation of the one or more winding rotating bodies;
    a support configured to receive and support, at the work height, the vertically movable work platform that is being lowered; and
    stopper means configured to prevent a rotation of the one or more winding rotating bodies in a direction that tends to lower the vertically movable work platform when the vertically movable work platform reaches the work height, wherein the stopper means is configured such that when a fed-out amount of the suspension wires from the one or more winding rotating bodies is less than a predetermined amount, the stopper means allows the one or more winding rotating bodies to rotate both in a direction to spool the suspension wires and thereby raise the vertically movable work platform and in a direction to feed out the suspension wires and thereby lower the vertically movable work platform toward the support, and such that when the fed-out amount of the suspension wires from the one or more winding rotating bodies is equal to the predetermined amount, the stopper means allows the rotation of the one or more winding rotating bodies in the direction to spool the suspension wires and restricts the rotation of the one or more winding rotating bodies in the direction to feed out the suspension wires, and wherein the predetermined amount is a fed-out amount of the suspension wires when the vertically movable work platform reaches the work height and is received and supported on the support.

2. The article storage facility as defined in claim 1, further comprising:
a rotating operation rotating body configured to spool an operating wire fed out from a rotating body of a manually operated vertical movement operating member and to feed out the operating wire spooled by the rotating body of the vertical movement operating member wherein the one or more of winding rotating bodies rotate in unison with the rotating operation rotating body.

3. The article storage facility as defined in claim 2, wherein the stopper means includes an abutting member provided to the operating wire, and a wire accommodating body which the operating wire extends through and which receives and stops the abutting member at a position where the vertically movable work platform reaches the work height.

4. The article storage facility as defined in claim 1, wherein the stopper means includes a movable body that meshes with a pivot shaft which rotates in unison with the one or more of winding rotating bodies and that moves in the direction of the axis of the pivot shaft as the one or more of the winding rotating bodies rotate, and a receiving body that restricts movement of the movable body such that an end of a moving range of the movable body in the direction of a pivot shaft is a position that corresponds to the work height for the vertically movable work platform.

5. The article storage facility as defined in claim 1, further comprising:
a transport device configured to move vertically to transport articles between a storage unit and an article take-in-and-out portion, wherein the retreat height is higher than an upper end of a vertical movement range of the transport device, and the work height is located at an intermediate position of the vertical movement range, so that the transport device is moved vertically over an entire range of the vertical movement range by positioning the vertically movable work platform at the retreat height, and the vertically movable work platform is vertically moved between the work height and the retreat height by positioning the transport device below the intermediate position in the vertical movement range.

6. The article storage facility as defined in claim 1, wherein the retreat height for the vertically movable work platform is adjacent an upper end location in the rack vertical direction in the travel space located forwardly of the article storage rack and the work height is at a vertically intermediate location in the rack vertical direction in the travel space, wherein
the article storage rack includes an entrance for entering and exiting the travel space to get on and off the vertically movable work platform located at the work height, and a maintenance door for opening and closing the entrance, and wherein
door opening prevention means is provided for allowing the maintenance door to be opened when the vertically movable work platform is located at a height close to the work height, and for preventing opening of the maintenance door when the vertically movable work platform is located above the work height or a height close to the work height.

7. The article storage facility as defined in claim 6, wherein the door opening prevention means includes a preventing body which can be switched between a permitting attitude in which the maintenance door is allowed to be opened and a preventing attitude in which an opening operation is prevented wherein the preventing body is urged toward the preventing attitude, and wherein
the preventing body is configured to be displaced toward the permitting attitude by an operating force associated with a lowering movement of the vertically movable work platform when the vertically movable work platform is located at a height close to the work height, and to be released from the operating force from the vertically movable work platform to be returned toward the preventing attitude when the vertically movable work platform is located above the height close to the work height.

8. The article storage facility as defined in claim 7, wherein a manually operating element for switching the preventing body between the permitting attitude and the preventing attitude is removably provided to the insert portion which can be accessed from outside the travel space.

9. The article storage facility as defined in claim 6, further comprising:
a manually operable vertical movement operating member provided to an exterior side of an outer wall, in which the entrance is formed, for rotating the one or more of winding rotating bodies;
a checking window provided to at least one of the maintenance door and the outer wall; and
a display portion located at a position at which the display portion can be visually checked from the checking window to indicate that the vertically movable work platform is raised to the retreat height.

10. The article storage facility as defined in claim 9, wherein
the checking window is provided to the maintenance door provided at a position corresponding to one end side of the travel space in the rack lateral width direction, and wherein
the display portion is provided at a position corresponding to an opposite end side of the travel space in the rack lateral width direction.

11. The article storage facility as defined in claim 9, wherein
the display portion includes a display body having a colored portion for visual check and a cover body for covering the colored portion for visual check, and is configured such that the colored portion is exposed from the cover body as the display body of the display portion is lifted by engaging the vertically movable work platform which is being raised and such that the colored portion is covered by the cover body as the display body of the display portion is lowered by engaging the vertically movable work platform which is being lowered.

12. The article storage facility as defined in claim 11, wherein
the colored portion for visual check has sections colored in different colors arranged in the rack vertical direction of the display body.

13. The article storage facility as defined in claim 11, wherein
an engaged portion configured to engage the vertically movable work platform is provided in a laterally central portion of the display body.

14. The article storage facility as defined in claim 1, wherein
the retreat height for the vertically movable work platform is adjacent an upper end in the rack vertical direction of the travel space located forwardly of the article storage rack, and the work height is at a vertically intermediate location in the rack vertical direction in the travel space, wherein
the article storage rack includes an entrance for entering and exiting the travel space, and a maintenance door for opening and closing the entrance, wherein the one or more of winding rotating bodies are provided above the entrance in the article storage rack, and wherein
a vertical movement operating member operatively connected to the one or more winding rotating bodies and configured to be manually rotated to rotate the one or more winding rotating bodies is provided and located laterally of the entrance of the article storage rack.

15. The article storage facility as defined in claim 14, wherein
the vertically movable work platform is formed to be long in the rack lateral width direction, wherein
a plurality of the winding rotating bodies are arranged in the rack fore and aft direction, and wherein
the vertically movable work platform is suspended and supported by a plurality of wires at both end locations in the rack lateral width direction.

16. The article storage facility as defined in claim 14, wherein
a rotating operation rotating body that rotates in unison with the winding rotating bodies is provided, and wherein
an operating wire fed out from a rotating body of a manually operated winch which functions as a vertical movement operating member is wound around the rotating operation rotating body so that the operating wire is spooled by the rotating operation rotating body as the vertically movable work platform is lowered.

17. The article storage facility as defined in claim 15, wherein
a rotating operation rotating body that rotates in unison with the winding rotating bodies is provided, and wherein
an operating wire fed out from a rotating body of a manually operated winch which functions as a vertical movement operating member is wound around the rotating operation rotating body so that the operating wire is spooled by the rotating operation rotating body as the vertically movable work platform is lowered.

* * * * *